United States Patent [19]

Brown

[11] Patent Number: 5,214,749
[45] Date of Patent: May 25, 1993

[54] DYNAMIC CONTROL OF A ROBOT WITH ITS CENTER OF MASS DECOUPLED FROM AN END EFFECTOR BY A REDUNDANT LINKAGE

[75] Inventor: Kevin L. Brown, Somerville, Mass.

[73] Assignee: Massachusetts Institute of Technology, Cambridge, Mass.

[21] Appl. No.: 714,422

[22] Filed: Jun. 12, 1991

[51] Int. Cl.⁵ .............................................. G06F 15/00
[52] U.S. Cl. ........................................ 395/95; 395/94; 395/96; 364/424.02; 901/48
[58] Field of Search ............... 395/95, 96, 94; 901/48; 364/424.02

[56] References Cited

U.S. PATENT DOCUMENTS

| | | | |
|---|---|---|---|
| 3,618,786 | 11/1971 | Fick | 214/141 |
| 4,297,908 | 11/1981 | Zimmer | 74/105 |
| 4,433,382 | 2/1984 | Cunningham | 364/474 |
| 4,620,829 | 11/1986 | Herve | 414/720 |
| 4,648,785 | 3/1987 | Nakagawa et al. | 414/917 |
| 4,695,027 | 9/1987 | Lindholm et al. | 248/325 |
| 4,712,971 | 12/1987 | Fyler | 414/744 R |
| 4,756,662 | 7/1988 | Tanie et al. | 414/729 |
| 4,775,289 | 10/1988 | Kazerooni | 414/735 |
| 4,925,312 | 5/1990 | Onaga et al. | 395/95 |

FOREIGN PATENT DOCUMENTS 330548  8/1989  European Pat. Off. .

OTHER PUBLICATIONS

Patent Abstracts to Denmark Patent Nos. 3,038,436 and 2,000,013.

Primary Examiner—Allen R. MacDonald
Attorney, Agent, or Firm—Hamilton, Brook, Smith & Reynolds

[57] ABSTRACT

A robot is provided with a dynamically controlled center of mass which is decoupled from the end effector. The robot is comprised of a moving arm including a redundant linkage of connecting links and joints coupled to an end effector. The movement of the links and joints of the robot are coordinated by a dynamic servo controller. The robot has at least twice as many degrees of freedom as the number of operating dimensions. Also, for each dimension of operation, there is one group of masses that moves in the same direction as the end effector and another group of masses capable of independently moving in the same or opposite direction. This separation of the motion of the center of mass from the motion of the end effector can be used to decrease reaction forces and to generate significant forces at the end effector.

16 Claims, 12 Drawing Sheets

DYNAMIC CONTROL OF A ROBOT WITH ITS CENTER OF MASS DECOUPLED FROM AN END EFFECTOR BY A REDUNDANT LINKAGE

BACKGROUND OF THE INVENTION

Most dynamic tasks performed by robots involve manipulation with high accelerations and application of forces to the environment. However, these tasks depend on the joint torques of the robot and reaction forces to the robot's base. For the case of manipulating objects with high accelerations, the reaction forces can be quite high. Applying forces to the environment also can produce high reaction forces and in addition require that all of the joint torques create the applied force. The production of these reaction forces and the dependence on joint torques can significantly limit the robot's performance.

Many conventional robots use counterweights to eliminate reaction forces generated by robot manipulation. However, counterweights add significant mass to the system and require the use of more powerful motors. Thus, the use of counterweights is undesirable for high-speed manipulation.

Conventional robots apply forces by relying on torques at each joint and reaction forces to the base. Therefore, the limiting factors for producing a force with a conventional robot are the weakest joint torque and the maximum allowable reaction force. These limitations significantly reduce the possible performance of robots

SUMMARY OF THE INVENTION

The present invention comprises a robot configuration made up of a redundant plurality of links that are connected together by actuated joints. Associated with these links is an end effector and a center of mass.

It has been found that by decoupling the motion of a robot's end effector from its center of mass, many dynamic tasks can be accomplished. These tasks are accomplished by sending the end effector and the center of mass on separate specified trajectories. Using a robot with this capability, it is possible to eliminate reaction forces and to permit the application of large impulsive forces to the environment.

The invention comprises a robot with a dynamically controlled center of mass. The robot includes a robot arm with an end effector linkage and a redundant linkage. The end effector linkage includes an end effector which can move in n dimensions of movement, wherein for each dimension of movement of the end effector, the robot has at least two degrees of freedom. Associated with these degrees of freedom are two groups of masses. A first group of masses is capable of moving in the same direction as the direction of movement of the end effector. A second group of masses can be controlled independently to move in the same or opposite direction as that of the end effector movement. A dynamic controller coordinates the motion of the robot arm so that the end effector and center of mass can be moved on separate trajectories.

In a first embodiment of the invention, the robot's end effector is manipulated without producing reaction forces. The robot further includes a base, a robot arm coupled to the base with an end effector capable of moving in n dimensions and a robot linkage with a plurality of links and joints, and a dynamic controller for coordinating the motion of the robot arm. The linkage is redundant in the sense that for each n-dimensions of movement of the end effector, there are at least 2n degrees of freedom capable of motion in each n-dimensions. Associated with each of these n dimensions, there must also be a first group of masses that move in the direction of the end effector and a second group that must move in the opposite direction. The robot center of mass is caused to remain fixed while the position of the end effector is varied. Computer controller command signals coordinate the motion of the linkage such that the center of mass of the linkage remains fixed at a point in space. By fixing the center of mass, all internal forces are cancelled and no reaction forces are transmitted to the base, thus producing a zero reaction force robot. By using a computer coordinated redundant linkage, counterweights are not necessary.

Accordingly, the first embodiment of the invention drawn to a zero reaction force robot comprises a robot arm including an end effector linkage and a redundant linkage. The end effector linkage includes an end effector which can move in n dimensions of operation, wherein for each dimension of operation, the end effector linkage includes a first group of masses which moves in the same direction of movement as the end effector. The redundant linkage comprises a plurality of links and joints coupled to said end effector, wherein the redundant linkage includes a second group of masses which can be independently moved in the same or opposite direction of movement of the end effector. The zero reaction force robot further comprises a dynamic controller for moving the robot arm so that for each dimension of operation of the end effector there are at least two degrees of freedom of the robot arm to decouple the center of mass from the end effector. The invention can operate in linear, planar, and three dimensional modes of operation.

In the planar embodiment, the redundant linkage can be comprised of a plurality of links and joints which form a planar parallelogram. The end effector for the planar zero-reaction force robot is comprised of two links which are connected by a joint. The end of one end effector link is connected to the redundant linkage at a first vertex so that the end of the other end effector link serves as a tip which moves in a plane. The redundant linkage is coupled to the base at a moving joint or second vertex. The dynamic controller moves the redundant linkage and the end effector in accordance with the following constraint:

$$\phi_1 = \arctan\left(\frac{A_4 y - A_2 Y}{A_4 x - A_2 X}\right)$$

$$\phi_2 = \arctan\left(\frac{A_3 y - A_1 Y}{A_3 x - A_1 X}\right)$$

$$\theta_1 = \arctan\left(\pm \sqrt{\frac{(A_1A_4 - A_2A_3)^2}{(A_4x - A_2X)^2 + (A_4y - A_2Y)^2} - 1}\right)$$

$$\theta_2 = \arctan\left(\pm \sqrt{\frac{(A_1A_4 - A_2A_3)^2}{(A_3x - A_1X)^2 + (A_3y - A_1Y)^2} - 1}\right)$$

$$\begin{bmatrix} \dot{\phi}_1 \\ \dot{\theta}_1 \\ \dot{\phi}_2 \\ \dot{\theta}_2 \end{bmatrix} = \begin{bmatrix} -A_1\cos\theta_1\sin\phi_1 & -A_1\sin\theta_1\cos\phi_1 & -A_2\cos\theta_2\sin\phi_2 & -A_2\sin\theta_2\cos\phi_2 \\ A_1\cos\theta_1\cos\phi_1 & -A_1\sin\theta_1\sin\phi_1 & A_2\cos\theta_2\cos\phi_2 & -A_2\sin\theta_2\sin\phi_2 \\ -A_3\cos\theta_1\sin\phi_1 & -A_3\sin\theta_1\cos\phi_1 & -A_4\cos\theta_2\sin\phi_2 & -A_4\sin\theta_2\cos\phi_2 \\ A_3\cos\theta_1\cos\phi_1 & -A_3\sin\theta_1\sin\phi_1 & A_4\cos\theta_2\cos\phi_2 & -A_4\sin\theta_2\sin\phi_2 \end{bmatrix}^{-1} \begin{bmatrix} \dot{x} \\ \dot{y} \\ \dot{X} \\ \dot{Y} \end{bmatrix}$$

where x, y is the position of the end effector tip, X, Y is the position of the robot center of mass, $\phi_1$ is the angular displacement of a diagonal connecting the first and fourth joints from the base, $\phi_2$ is the angular displacement of the end effector from the base, $\theta_1$ is the angular displacement of the diagonal from the first link, $\theta_2$ is the angular displacement of the fifth link and the sixth link from the plane of the redundant linkage, $A_1$ is the length of the redundant linkage completely extended, $A_2$ is the length of the end effector completely extended, $A_3$ is the center of mass location of the redundant linkage comprising links $l_1$–$l_4$, and $A_4$ is the center of mass location of the end effector linkage comprising links $l_5$ and $l_6$. The velocity values are designated by a dot over the parameter.

The techniques of the invention can also be applied to operation in three dimensions. For example, a humanoid zero-reaction force robot with a dynamically controlled center of mass comprises a base link, a first moving joint, a redundant linkage including a leg link, the first moving joint coupling the leg link to the base link, a body link, a second moving joint coupling the body link to said link, an end effector including: a first arm link coupled to said body link by a third moving joint, a second arm link, including a holding tip, coupled to said first arm link by a fourth moving joint, wherein for each dimension of operation, the end effector includes a first mass which moves in the same direction of movement as the end effector and the redundant linkage includes a second mass which can be independently moved in the same or opposite direction of movement of the first mass of the end effector, a head unit, connected to the body unit, including: a video camera, and a dynamic controller for moving the robot arm so that for each dimension of operation of the end effector there are at least two degrees of freedom of the robot arm to decouple the center of mass from the end effector and prevent the coupling of reaction forces to the base link.

In a second embodiment of the invention, the robot dynamically produces impact forces to the environment. As noted above, the robot comprises a redundant plurality of links. Associated with these links is an end effector and a center of mass. The arm is designed redundantly so that the arm has twice as many degrees of freedom for each dimension of operation of the end effector. For each dimension of end effector motion, two masses exist; one group of masses that moves in the direction of the end effector and another group of masses which is capable of motion in the same or opposite direction. In this case, the end effector is fixed at the point where the force is desired and the center of mass is accelerated to impart impulsive forces at the end effector. Since the linkage is redundant, it is possible for it to be manipulated even though the end effector is fixed. By meeting the redundancy criteria, it is possible for the center of mass of the linkage to be directed by computer control so that desired forces are produced at the end effector. Moreover, by moving the center of mass along a line which passes through the fixed point of the end effector, no reaction forces will be transmitted through the base.

In a third embodiment of the invention, both the position of the end effector and the robot center of mass are changed to accomplish the dynamic task of lifting heavy objects.

The above and other features of the invention including various novel details of the construction and combinations of parts will now be more particularly described with reference to the accompanying drawings as pointed out in the claims. It will be understood that the particular device embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE PREFERRED EMBODIMENTS

Many practical dynamic tasks can be accomplished if a robot is constructed with the ability to move the end effector independently from the center of mass. This functionality can be achieved by creating the robot with a special form of redundancy. A robot is typically constructed of a group of links with each link having mass. To be able to move the end effector separately from the center of mass, for each dimension of operation there must be one group of masses that moves in the same direction as the end effector and another that must be capable of independently moving in the same or the opposite direction. To achieve this criterion, the robot should be constructed such that for each dimension of operation of the end effector there are at least two degrees of freedom.

Figure 1:
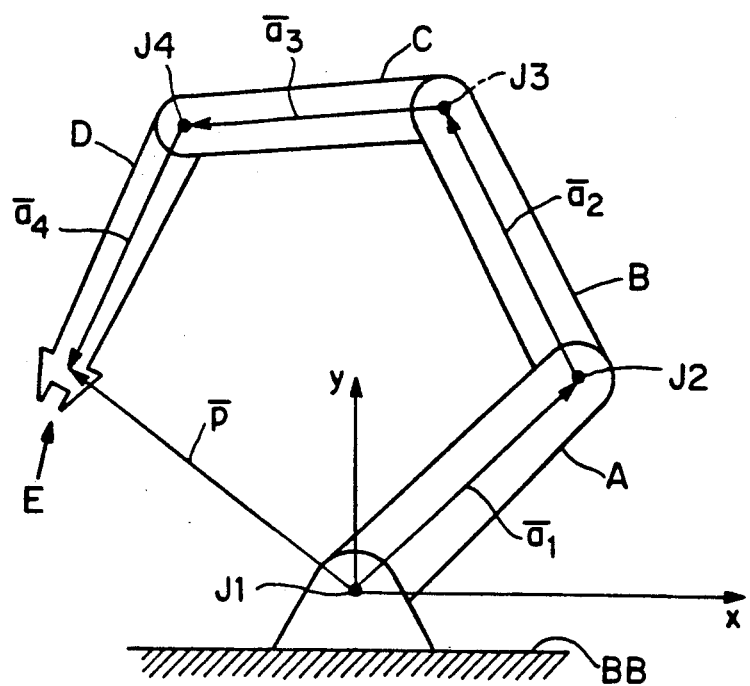
FIG. 1 is a schematic of a system of links with the position vector of the end effector expressed as the summation of the position vectors of each link.

FIG. 1 show an example of a two-dimensional robot which is constructed in accordance with this redundancy criterion. End effector E is coupled to base BB by the redundant linkage of coupling links A, B, C, D and associated joints J1, J2, J3, J4. Position vectors $a_1$, $a_2$, $a_3$, $a_4$, respectively, represent the position vectors for links A, B, C, and D, respectively. The position vector $\bar{p}$ for end effector E is equal to the summation of position vectors $a_1$ to $a_4$. End effector E and its mass can move in two dimensions. Some of the links of the redundant linkage and their respective mass are capable of moving independently in the same or opposite direction of the mass that moves in the same direction as the end effector. For each dimension of operation of the end effector, there are two degrees of freedom for the robot. Thus, the redundancy criteria are satisfied. Note that the device of FIG. 1 illustrates the minimum number of links required to satisfy the redundancy criteria for a two dimensional robot.

To apply a robot of this construction to dynamic tasks, trajectories for the end effector and for the center of mass must be determined. These trajectories will depend on the requirements of the dynamic task, the limitations of the workspace, and the configuration of the robot. Given the end effector trajectories and the center of mass trajectories, it is necessary to compute the method of coordinating the links to achieve these trajectories. This method of coordination is discussed below.

Determination of Joint Positions

In order to coordinate the motion of the robot, it is necessary to find the joint displacements in terms of the end effector position and the center of mass position. The position of the end effector, $$p = \sum_{k=1}^{2n} a_k \quad \text{Equation (1)}$$

is illustrated in FIG. 1.

For n dimensions of end effector motion, there will be n coordinates that are needed to locate the end effector.

$$p_1 = f_1(q_1, q_2, \ldots, q_{2n}) \quad \text{Equation (2)}$$
$$\vdots$$
$$p_n = f_n(q_1, q_2, \ldots, q_{2n})$$

where $p_i$ represents the end effector position for each dimension and the $q_i$ are the joint displacements. There must exist at least 2n joint displacements to meet the redundancy criterion. That is, for each dimension of motion there is at least twice as many degrees of freedom.

Figure 2:
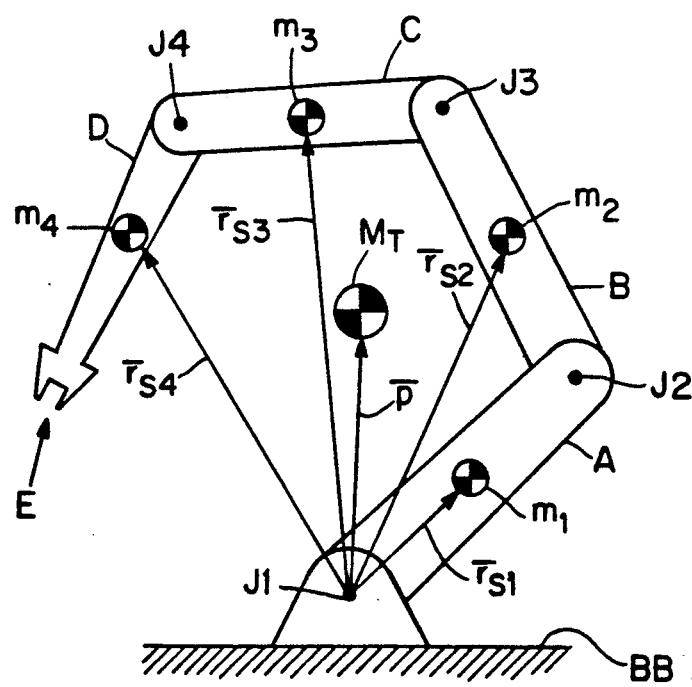
FIG. 2 is a schematic of a system of links with center of mass position shown in terms of the mass and position vector of each of n links.

It is also necessary to write expressions for the position of the center of mass in terms of the joint displacements. For example, the position of the center of mass can be expressed as $$\bar{P} = \frac{1}{M_T} \sum_{j=1}^{n} m_j \bar{r}_{Sj} \quad \text{Equation (3)}$$

where $M_T$ is the total mass of the mechanism, $m_j$ is the mass of each link, $\bar{r}_{Sj}$ is the position vector of each link and n is the number of links. FIG. 2 illustrates this convention where the center of mass position is shown in terms of the mass and position vector of each of n links.

Figure 3:
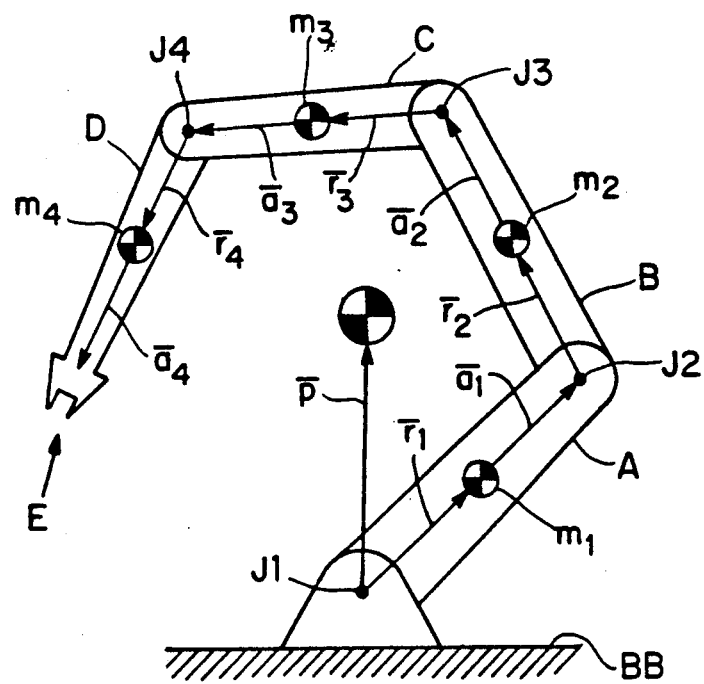
FIG. 3 is a schematic of a system of links with the center of mass position shown in terms of the mass and position vector defined using $\bar{r}_j$ and $\bar{a}_j$ vectors.

The center of mass trajectory can be rewritten by expanding the position $\bar{r}_{Sj}$ of the center of mass of each link as $$\bar{r}_{sj} = \bar{r}_j + \sum_{k=1}^{j-1} \bar{a}_k,$$ Equation (4)

where j is the number of pivot-to-pivot vectors between the base and the current link under consideration. FIG. 3 illustrates this convention with the center of mass position shown in terms of the mass and position vector defined using $\bar{r}_j$ and $\bar{a}_j$ vectors. Substituting this expression into equation (3) gives $$\bar{P} = \frac{1}{M_T} \sum_{j=1}^{n} \left( m_j \left[ \bar{r}_j + \sum_{k=1}^{j-1} \bar{a}_k \right] \right).$$ Equation (5)

That is, for each link in a mechanism, a position vector can be found that is represented by the sum of the pivot-to-pivot length vectors ($\bar{a}_k$) and the center of the mass vectors ($\bar{r}_j$) that define the distance from the end of a link to its center of mass. By multiplying each of these vectors by the mass of each link $m_j$, summing them together, and then dividing by the total mass $M_T$, an expression for the center of mass position $\bar{P}$ can be found.

This center of mass position can be written in terms of its n coordinates with the form $$P_1 = g_1(q_1, q_2, \ldots, q_{2n})$$ Equation (6)
.
.
.
$$P_n = g_n(q_1, q_2, \ldots, q_{2n})$$

To perform a dynamic task, the joint angles (q(t)'s) must be expressed in terms of the end effector positions (p(t)'s) and the center of mass positions (P(t)'s). To find the 2n joint angles of $q_1$ to $q_{2n}$, the 2n equations of Equations (2) and (6) can be solved. These solutions will be of the form $$q_1 = h_1(p_1, \ldots, p_n, P_1, \ldots, P_n)$$ Equation (7)
.
.
.
$$q_{2n} = h_1(p_1, \ldots, p_n, P_1, \ldots, P_n)$$

For many cases, a simple closed form solution does not exist. However, numerical methods can be applied to find a solution for a non-simple closed form solution.

Determination of joint velocities

To control the trajectories of the center of mass and end effector accurately, the joint velocities should be defined in terms of the end effector and center of mass velocities. One approach is to take the first derivative of the end effector coordinates (Eq. (2)). The Jacobian J is a matrix which relates the end effector velocity to the joint velocities:

$$\dot{p} = J\dot{q},$$ Equation (8)

where J is the n×2n Jacobian matrix $$J = \begin{bmatrix} \frac{\partial p_1}{\partial q_1} & \cdots & \frac{\partial p_1}{\partial q_{2n}} \\ \cdot & & \\ \cdot & & \\ \cdot & & \\ \frac{\partial p_n}{\partial q_1} & \cdots & \frac{\partial p_n}{\partial q_{2n}} \end{bmatrix}$$

The matrix J comprises the partial derivatives $p_1 \ldots p_n$ with respect to the joint displacements $q_1 \ldots q_{2n}$. The matrix J is referred to as the manipulator Jacobian and represents the infinitesimal relationship between end effector positions and joint displacements at a given robot position. For non-redundant robots, the Jacobian would be of dimension n×n. Therefore, the matrix would be invertible and it would be straightforward to solve for the joint velocities.

However, for a redundant robot, the Jacobian is rectangular and therefore not invertible. To find a solution, an extended Jacobian $J_e$ must be established. By taking the first derivatives of the center of mass coordinates, n mass property constraints can be established on the system. By adding these terms to the Jacobian, an extended Jacobian $J_e$ matrix can be defined which is square and invertible. The inverse of this matrix can be used to solve for the joint velocities directly. Thus, $$\dot{q} = J_e^{-1} \dot{p}$$ Equation (9)

or $$\begin{bmatrix} \dot{q}_1 \\ \cdot \\ \cdot \\ \cdot \\ \dot{q}_{2n} \end{bmatrix} = \begin{bmatrix} \frac{\partial p_1}{\partial q_1} & \cdots & \frac{\partial p_1}{\partial q_{2n}} \\ \cdot & & \\ \frac{\partial p_n}{\partial q_1} & \cdots & \frac{\partial p_n}{\partial q_{2n}} \\ \frac{\partial P_1}{\partial q_1} & \cdots & \frac{\partial P_1}{\partial q_{2n}} \\ \cdot & & \\ \frac{\partial P_n}{\partial q_1} & \cdots & \frac{\partial P_n}{\partial q_{2n}} \end{bmatrix}^{-1} \begin{bmatrix} \dot{p}_1 \\ \cdot \\ \dot{p}_n \\ \dot{P}_1 \\ \cdot \\ \dot{P}_n \end{bmatrix}$$

assuming Det $J_e$=0, where Det $J_e$ is the determinant of the matrix $J_e$. (A determinant is a certain real-valued function of the column vectors of a square matrix which is zero only if the matrix is singular. A singular matrix has no inverse, i.e. det=0. A singularity is a point where a function of real or complex variables is not differentiable or analytic.)

Singularities and the Workspace

Singularities can represent situations in which the manipulator moves to a configuration in which it no longer has complete freedom of its planned mobility. Thus, singularities represent robot arm configurations where the links are fully extended or fully contracted. By setting the determinant of the extended Jacobian to zero, the singularities of the robot can be found; that is, $$\det[J_e] = 0$$ Equation (10)

Figure 4:
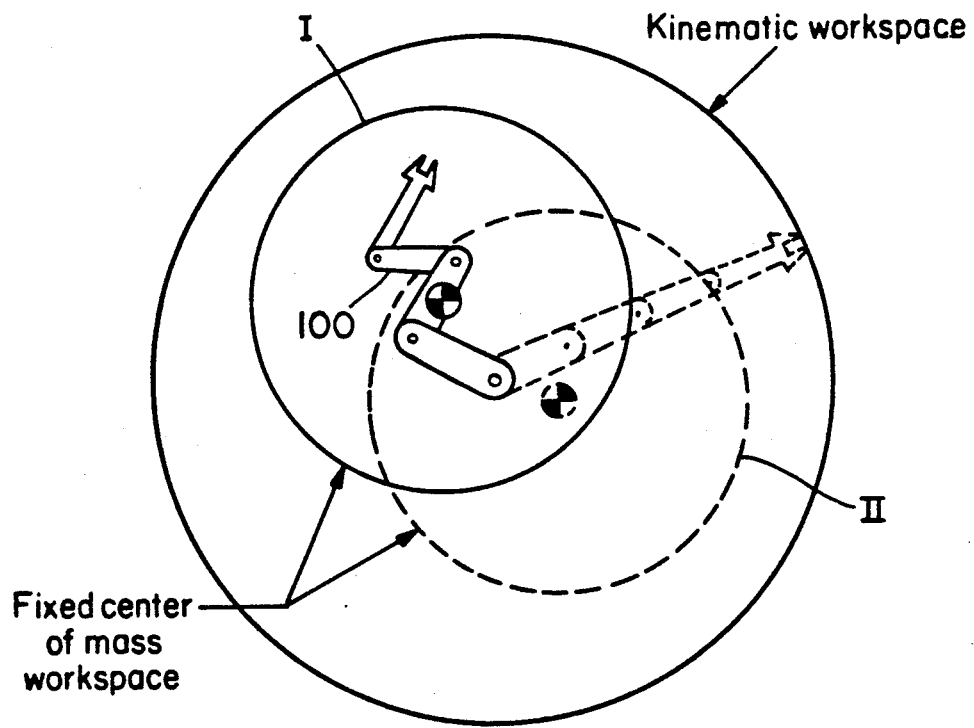
FIG. 4 is a schematic representation of the workspace of a robot.

The solution that results contains two components. The first component of the solution is a function of only joint angles. This component shows the kinematic singularities that indicate the configurations from which the robot will be limited in possible motions. The second component is a function of the joint angles and also mass, inertia, and the dimensions of each of the links. This group of singularities is defined as dynamically constrained. These singularities are caused by configurations in which the motion of the end effector would be coupled to the motion of the center of mass. FIG. 4 shows the kinematic singularity workspace representing the fully extended robot arm, as well as Areas I and II which represent the regions of fixed center of mass, zero reaction force, dynamically constrained movement workspace. Typically, the dynamically constrained singularities limit the motion of the manipulator before the kinematic singularities impose restrictions. During a phase of operation in which reaction forces can be tolerated, the center of mass location can be moved to a new location. A new zero reaction workspace can be established around the new center of mass location. This use of subspaces of zero reaction force increases the total workspace of the zero reaction force robot.

Theoretical Basis for Zero Reaction Force Robots

As noted previously, robots are formed of joints and links extending from a base and ending in an end effector. The following theoretical analysis assumes that each link is rigid and has a constant length and mass. The following analysis is applicable to one, two, or three dimensional devices. FIGS. 2 and 3 illustrate planar robots in schematic form which are constructed in accordance with the redundancy criteria. FIG. 2 illustrates the robot center of mass in terms of the center of mass of each link as expressed in terms of vectors referenced to the origin at J1. FIG. 3 illustrates the robot center of mass in terms of the length of each link and the mass of each link represented by respective vectors referenced from respective joints. End effector E is coupled to base BB by coupling links A, B, C, D and associated joints J1, J2, J3, J4. Each joint having a respective mass $m_1-m_4$ and center of mass located at a radial distance $r_{s1}-r_{s4}$ from joint J1 of base BB. Thus, the robots of FIGS. 2 and 3 have two degrees of freedom for each dimension of operation of the end effector E. A portion of the mass of redundant linkage A, B, C, and D is capable of being moved independently in the same or opposite direction of movement of the mass of the end effector.

To counteract reactive forces generated by the end effector movement, the links A, B, C, and D are computer controlled to provide coordinated motion of a redundant set of links. In this way, the links are dynamically repositioned to decouple the motion of the robot's end effector from its center of mass. Two degrees of freedom are provided for each dimension of movement of the end effector. Thus, the robot center of mass can be fixed to eliminate reaction forces while the end effector is accelerated.

A "dimension of movement" is any measurable extent in the X-Y plane or the space perpendicular thereto and any rotation about the X, Y, Z axis. A robot capable of operating only in a line (one dimension, i.e. x-direction) must have two degrees of freedom to meet the redundancy criteria. A robot operating in a plane (two dimensions, i.e. x-y direction) will have four degrees of freedom. A robot operating in three dimensional space will have six degrees of freedom. In general, 2n degrees of freedom are provided. Thus, n represents the number of dimensions in which the end effector is capable of movement.

The planar robots of FIGS. 2 and 3 show the summation of the center of masses of the respective links to achieve a fixed center of mass for the robot. For a zero reaction robot, the conservation of forces theorem requires that the summation of all external forces applied to the base of the robot equal zero for the reaction force at the base of the robot to be zero. Similarly, the linear momentum of the system with respect to an inertial point must be zero. Conservation of momentum means that the center of mass indicated by the symbol ⊙ of the system either must be stationary or must be moving with a constant linear velocity. For a robot mounted on earth, the center of mass must be stationary. Also, $M_T \overline{V} = 0$, where $M_T$ is the total mass of the robot and $\overline{V}$ is the velocity of its center of mass. Therefore, the mass-distance product must be constant.

$$M_T \overline{P} = \text{constant}, \qquad \text{Equation (11)}$$

where $\overline{P}$ is the center of mass trajectory of a system of links, as shown in FIG. 2. Because the mass of a robot is constant, its center of mass must remain fixed to satisfy Equation (11).

As noted previously, the location of the robot center of mass $\overline{P}$ can be expressed in terms of the respective center of mass of the respective links. See Equation (5). That is, for each link in a mechanism, a trajectory vector can be found that is represented by the sum of the pivot-to-pivot length vectors ($\overline{a}_k$) and the center of mass vectors ($\overline{r}_j$) that define the distance from the end of a link to its center of mass. By multiplying each of these vectors by the mass of each link $m_j$, summing them together, and then dividing by the total mass $M_T$, an expression for the center of mass location $\overline{P}$ can be found. The first embodiment solves Equation (5) by balancing terms so that the entire sum (represented by $\overline{P}$) is zero.

As was noted previously in the general discussion of robot dynamics, to effect proper control of the robot coupling linkage by a microprocessor controlled motor, the joint positions must be expressed in terms of the location of the end effector tip p and the location of the robot center of mass P. See Equation (7). If there exists a closed-form solution to Equation (7), this solution would yield absolute joint displacements for given positions of the end effector.

Because of the form of Equations (2) and (6), it may not always be possible to find a closed form solution even though the system will always have 2n equations and 2n unknowns. For the cases in which a closed form solution for the joint displacements does not exist, numerical methods can be applied to calculate the joint positions.

As noted previously, the joint velocities can be determined from Equation (9) wherein the robot center of mass velocity is zero and no reaction forces are produced.

First Embodiment: Zero-Reaction Robot

To achieve a fixed center of mass, and thus eliminate all reaction forces, redundant manipulators are provided in accordance with the invention. As noted previously, the redundant manipulator includes an extra set of joints and linkages that permit an added degree of freedom to balance end effector forces. For each redundant degree of freedom, there exists two groups of masses. A first group of masses moves in the same direction as the end effector. A second group of masses, associated with the redundant manipulator, can be moved in the same or opposite direction of movement of the end effector. The mass of the connecting links emulate counterweights. Preferably, the minimum mass for each link is used. Since all moving mass is functional, the system is extremely light. Moreover, it is easier to move the center of mass of a lighter system. Thus, the workspace area can be easily shifted to cover a larger total area.

As noted previously, FIG. 4 shows a robot arm 100 at a center of mass position I. The small mass of the zero reaction force robot permits easy movement of the center of mass to a new fixed position. Thus, the workspace size is significantly increased to encompass the areas of positions I, II, and a plurality of other areas within the region of kinematic singularities.

Computer control is used to coordinate link movement to achieve a fixed center of mass. If the two groups of masses are identical, then the end effector and the redundant links must be coordinated to move the same amount in opposite directions. However, if the mass associated with the end effector is less than the mass of the group moving in the opposite direction, then the end effector will have to be moved a much greater distance.

Figures 5A, 5B:
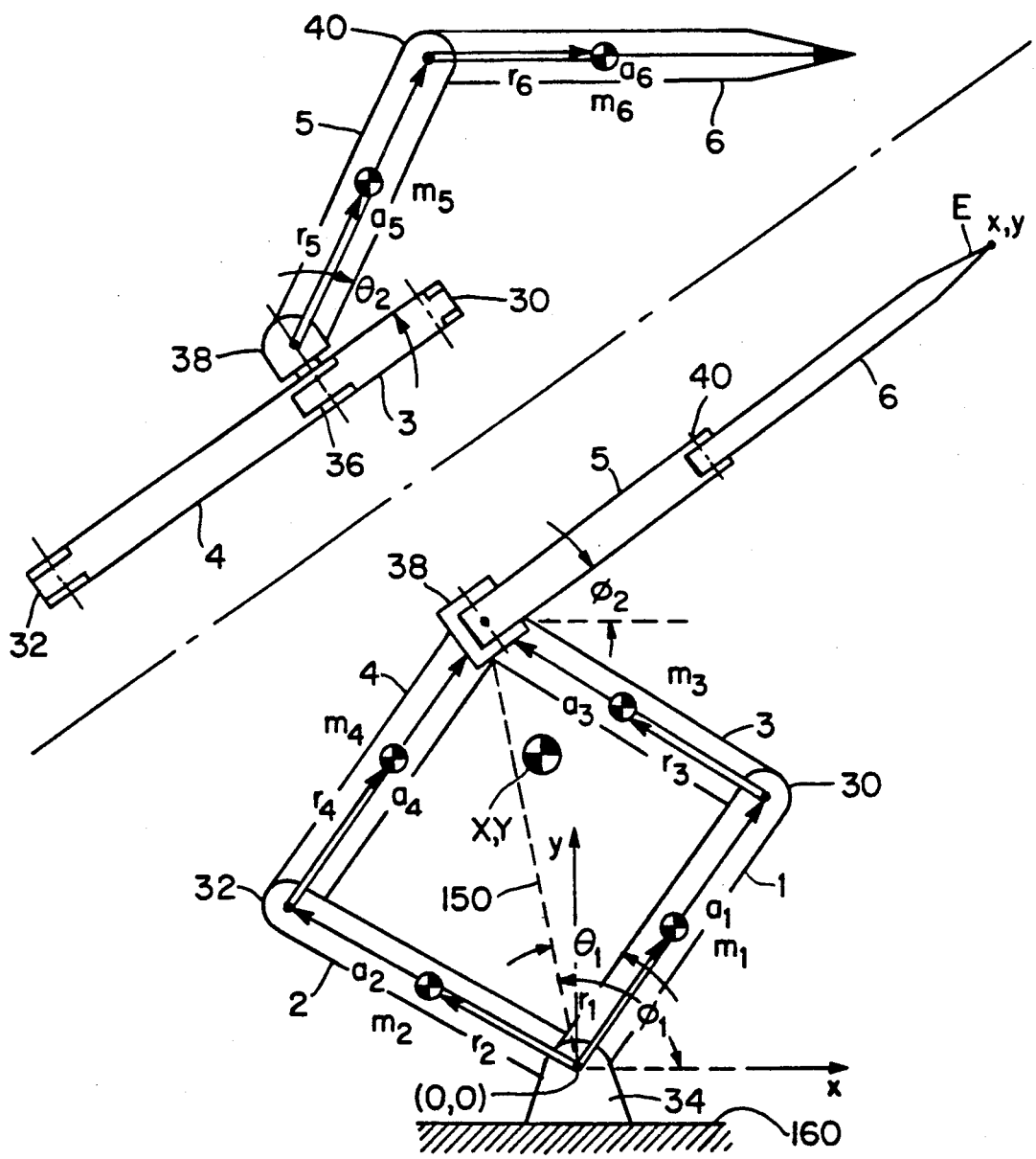
FIG. 5(a) is a top view of the first embodiment of the invention.
FIG. 5(b) is a side view of the first embodiment of the invention.

FIGS. 5(a), (b), 6(a), (b), and 7(a), (b) illustrate the application of the zero reaction technique to a planar robot. FIGS. 5(a) and (b) illustrate the joint positions in terms of the end effector position. FIG. 5(a) is a top view of a two dimensional, four degrees of freedom robot having an end effector E and a redundant linkage with six links 1-6. FIG. 5(b) is a side view of the robot of FIG. 5(a).

Figure 6A:
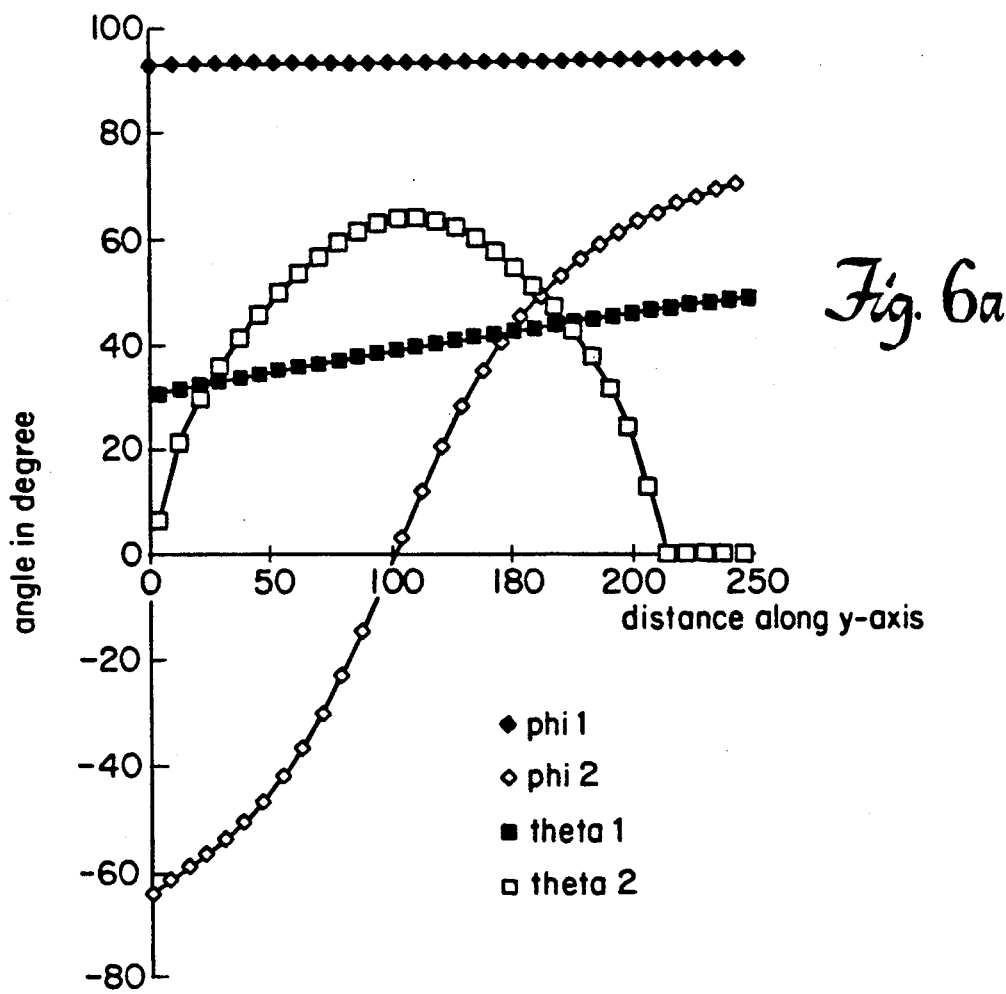
FIG. 6(a) is a plot of robot joint angles $\phi_1$, $\phi_2$, $\theta_1$ and $\theta_2$ in degrees versus the position of the end effector tip along the y-axis, where the position of the end effector tip in the x-direction is constant.
Figure 6B:
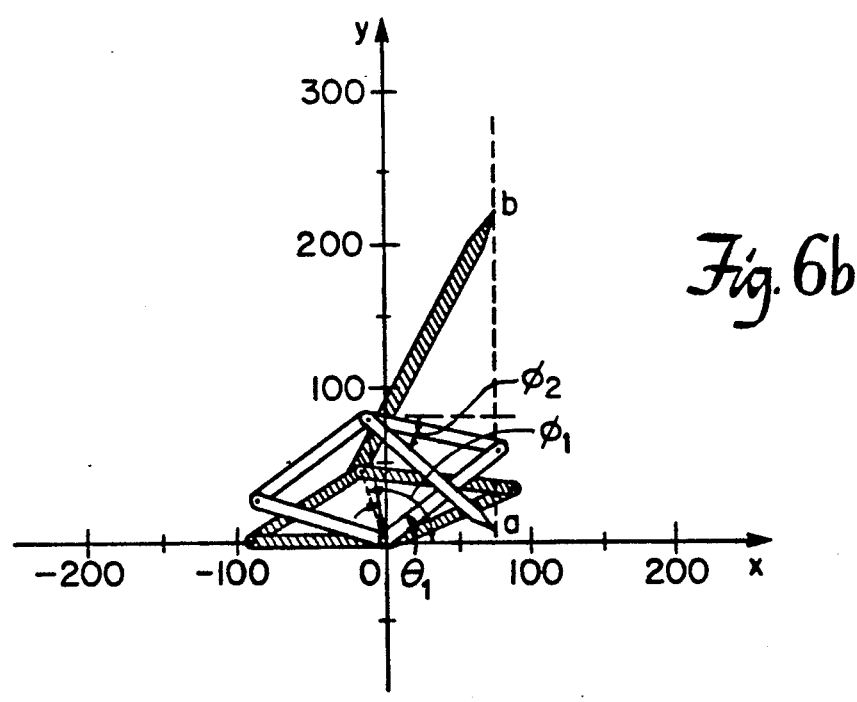
FIG. 6(b) is a plot of the movement of robot links and joints in the X-Y plane where the position of the end effector tip varies along the y-axis for a given location on the x-axis.

The end effector is comprised of a link 6 (with a mass $m_6$ and a length $a_6$) and a link 5 (with a mass $m_5$ and a length $a_5$) as shown in FIG. 6(b). Links 5 and 6 are joined by joint 40. The extension of the end effector can be expressed in terms of the angle $\theta_2$ of joint 38 between links 5 and 6 and the plane of links 1 to 4 of the redundant linkage. The extension of the end effector is symmetric. The edge of link 6 intersects the plane of the redundant linkage at an angle $\theta_2$. Thus, links 5 and 6 of the end effector form an isosceles triangle with the plane of the redundant linkage. The location of the center of mass for each link is shown by the symbol ⊙ and vector $r_i$.

The remaining joint angles which describe the robot arm configuration are shown in FIG. 6(a). The redundant linkage is comprised of link 1 (with a mass $m_1$, and a length $a_1$), a link 2 (with a mass $m_2$ and a length $a_2$), a link 3 (with a mass $m_3$ and a length $a_3$), and a link 4 (with a mass $m_4$ and a length $a_4$). Links 1 and 2 are joined by moving joint 34 which is attached to base 160. The pivot axis (0,0) of moving joint 34 serves as the origin of the coordinate system represented by the x-axis and y-axis. Links 1 and 3 are jointed by moving joint 30. Links 2 and 4 are joined by moving joint 32.

The end effector linkage moving joint 38 is connected to redundant linkage moving joint 36 to couple the end effector linkage to the redundant linkage. The angle $\phi_2$ represents the angular displacement of the end effector from the x-axis. The diagonal 150 connects joint or vertex 34 with joint or vertex 36 of the redundant linkage parallelogram. The angle $\theta_1$ represents the angular displacement of the link 1 from the diagonal 150. These four angles $\theta_1$, $\theta_2$, $\phi_1$, and $\phi_2$, completely describe the robot arm configuration. By expressing these angles in terms of the end effector position and the robot center of mass position, an algorithm can be derived for determining what angular displacements will fix the position of the robot center of mass regardless of the movement of the end effector.

The robot ar is manipulated in accordance with the following analysis to fix the center of mass and eliminate reaction forces at the base. The desired end effector coordinates can be expressed by using the form of Equation (2) as follows:

$$x = (a_1+a_2)\cos\theta_1\cos\phi_1 + (a_5+a_6)\cos\theta_2\cos\phi_2 \quad \text{Equation (12)}$$

and $$y = (a_1+a_2)\cos\theta_1\sin\phi_1 + (a_5+a_6)\cos\theta_2\sin\phi_2 \quad \text{Equation (13)}$$

where x and y are the coordinates of the endpoint, each link is of length "a", and $\theta_1$ is the angular joint displacement of link 1 from the diagonal connecting joints 34 and 36, $\theta_2$ is the angular displacement of link 5 from the plane of links 1, 2, 3, and 4, $\phi_1$ is the angular displacement of the diagonal, connecting joint 34 to joint 36, from the x axis, and $\phi_2$ is the angular displacement of link 5 from a line parallel to the x axis. For this simplification, let $a_1=a_2=a_3=a_4$.

The expressions for the center of mass location in terms of the joint displacements can be written using the form of Equation (6):

$$X = \frac{1}{M_T}\{2[m_1r_1 + m_2r_2 + (m_2 + m_5 + m_6)a]\cos\theta_1\cos\phi_1 + [m_5r_5 + m_6(r_6 + a_5)]\cos\theta_2\cos\phi_2\} \quad \text{Equation (14)}$$

and $$Y = \frac{1}{M_T}\{2[m_1r_1 + m_2r_2 + (m_2 + m_5 + m_6)a]\cos\theta_1\sin\phi_1 + [m_5r_5 + m_6(r_6 + a_5)]\cos\theta_2\sin\phi_2\} \quad \text{Equation (15)}$$

where X and Y are the centroid initial fixed positions.

After trigonometric substitution and manipulation, Equations (12)-(15) can be solved in the form of Equation (7) for $\phi_1$, $\theta_1$, $\phi_2$, and $\theta_2$ to give:

$$\phi_1 = \arctan\left(\frac{A_4y - A_2Y}{A_4x - A_2X}\right) \quad \text{Equation (16)}$$

$$\theta_1 = \arctan\left(\pm\sqrt{\frac{(A_1A_4 - A_2A_3)^2}{(A_4x - A_2X)^2 + (A_4y - A_2Y)^2} - 1}\right)$$

$$\phi_2 = \arctan\left(\frac{A_3y - A_1Y}{A_3x - A_1X}\right)$$

$$\theta_2 = \arctan\left(\pm\sqrt{\frac{(A_1A_4 - A_2A_3)^2}{(A_3x - A_1X)^2 + (A_3y - A_1Y)^2} - 1}\right)$$

where $A_1=(a_1+a_2)$ which is the length of the redundant linkage section completely extended, $A_2=(a_5+a_6)$ which is the length of the end effector completely extended, $$A_3 = \frac{2}{M_T} [m_1 r_1 + m_2 r_2 + (m_2 + m_5 + m_6) a_1]$$

is the center of mass component associated with motion of the redundant linkage, and $$A_4 = \frac{2}{M_T} [m_5 r_5 + m_6 (r_6 + a_5)]$$

which is the center of mass component associated with motion of the end effector.

The joint angular velocities can be expressed as follows:

$$\begin{bmatrix} \dot{\phi}_1 \\ \dot{\theta}_1 \\ \dot{\phi}_2 \\ \dot{\theta}_2 \end{bmatrix} = \begin{bmatrix} -A_1\cos\theta_1\sin\phi_1 & -A_1\sin\theta_1\cos\phi_1 & -A_2\cos\theta_2\sin\phi_2 & -A_2\sin\theta_2\cos\phi_2 \\ A_1\cos\theta_1\cos\phi_1 & -A_1\sin\theta_1\sin\phi_1 & A_2\cos\theta_2\cos\phi_2 & -A_2\sin\theta_2\sin\phi_2 \\ -A_3\cos\theta_1\sin\phi_1 & -A_3\sin\theta_1\cos\phi_1 & -A_4\cos\theta_2\sin\phi_2 & -A_4\sin\theta_2\cos\phi_2 \\ A_3\cos\theta_1\cos\phi_1 & -A_3\sin\theta_1\sin\phi_1 & A_4\cos\theta_2\cos\phi_2 & -A_4\sin\theta_2\sin\phi_2 \end{bmatrix}^{-1} \begin{bmatrix} \dot{x} \\ \dot{y} \\ \dot{X} \\ \dot{Y} \end{bmatrix}$$ Equation (17)

FIGS. 6(a), (b) and 7(a), (b) illustrate the operation of the robot arm in accordance with the coordination equations (16). A detailed explanation of the application of the coordination Equations (16) and (17) to a planar robot will be recited in the discussion of the zero-reaction force device of FIGS. 8 and 9(a)–(d).

FIGS. 6(a) and 6(b) show how the change in the shape and position of the linkage can be controlled to compensate for robot arm movement in the Y direction so that the system center of mass remains fixed. FIG. 6(b) shows the response of the coupling linkage of a planar robot, such as the device of FIG. 5(b), as the tip of the end effector moves in the y-axis direction along a constant x-axis position. To move from point a to point b as rapidly as possible, the end effector tip accelerates rapidly along the line between a and b, until a point midway between a and b is reached. Then the end effector tip decelerates rapidly until it stops at point b. The shape and position of the coupling linkage varies in response to the movement of the end effector tip so that the total center of mass of the robot remains fixed. Thus, no reaction forces are transmitted to the base at coordinate position (0,0). As the tip of the end effector moves in the positive Y direction, a substantial portion of the mass of the coupling linkage moves in a direction opposite to the movement of the mass of the end effector. As a result, angle $\phi_2$ increases (as the end effector section rotates counterclockwise in the y direction), angle $\phi_1$ remains approximately the same (as the redundant linkage section does not rotate), angle $\theta_2$ increases as the end effector approaches the base of the end section (the end effector linkage section contracts) and then decreases as it moves away from its base (the end effector section linkage elongates), and angle $\theta_1$ increases (as the redundant linkage section continually contracts).

Figure 7A:
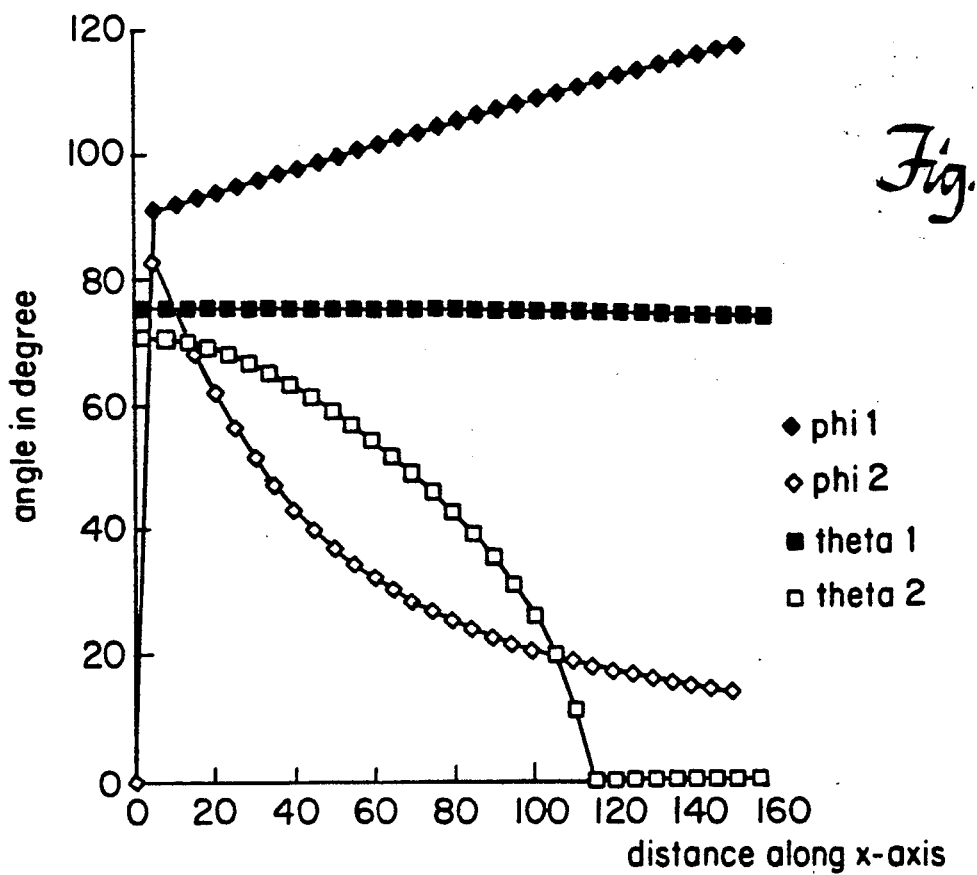
FIG. 7(a) is a plot of robot joint angles $\phi_1$, $\phi_2$, $\theta_1$ and $\theta_2$ in degrees versus the position of the end effector tip along the x-axis, where the position of the end effector tip on the y-axis is constant.
Figure 7B:
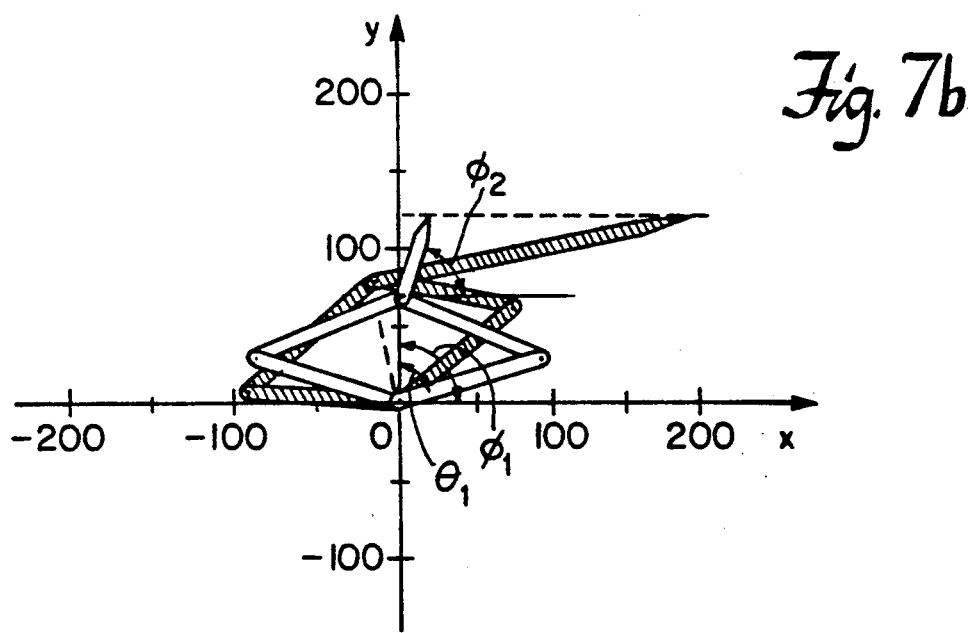
FIG. 7(b) is a plot of the movement of robot links and joints in the X-Y plane where the position of the end effector tip varies along the x-axis for a given location on the y-axis.

Similarly, FIGS. 7(a) and 7(b) show the change in the shape and position of the parallelogram linkage as the robot arm moves in the X direction. Again, the center of mass remains fixed as the end effector tip moves along the positive x axis because of the compensating movement of the coupling linkage. As a result, angle $\phi_2$ decreases (the end effector section rotates clockwise in the x direction), angle $\phi_1$ increases (the redundant linkage section rotates counterclockwise in the opposite direction), $\theta_2$ decreases (elongating the end effector section), and $\theta_1$ remains approximately constant (maintaining the geometry of the redundant linkage section). Thus, the redundant linkage moves in a direction opposite to the direction of the end effector.

Figure 8:
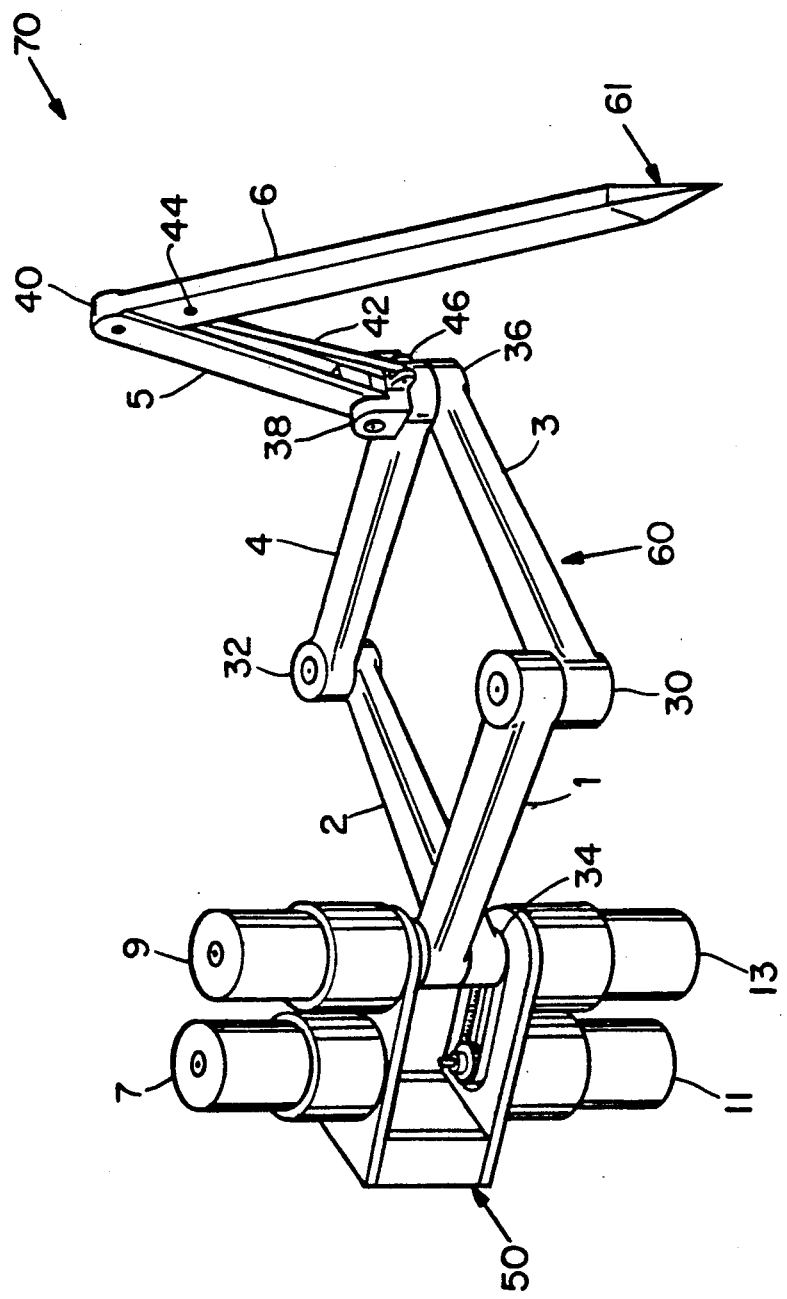
FIG. 8 is a perspective view of a first embodiment of the invention.

FIG. 8 illustrates how the planar robot of FIGS. 6(b) and 7(b) can be controlled to decouple reaction forces from the base 50. Motors 7, 9, 11, and 13 are positioned on the base 50 to simplify the dynamics. The robot arm is comprised of an end effector linkage 70 and a redundant linkage 60. Redundant linkage 60 provides a group of masses which will move in a direction opposed to the movement of the mass of the end effector linkage. The end effector linkage is comprised of links 5 and 6 which are joined together by joint 40. End effector tip 61 can be used to perform work. A four bar linkage is comprised of links 5 and 42, the portion of link 6 between joints 40 and 44, and the joint 46 extending from joint 38. The redundant linkage is comprised of links 1, 2, 3, and 4. Links 1 and 2 are coupled to the base by joint 34. Links 3 and 4 are joined together by joint 36. The end effector is attached to links 3 and 4 by joint 38. The linkage coupling is completed by joint 32 which joins links 2 and 4 and joint 30 which joins links 1 and 3. Thus, as the end effector moves in the x-y plane, the linkage coupling is activated in the opposite direction in that plane to achieve a fixed center of mass and the redundancy requirement is satisfied. The robot has at least twice as many degrees of freedom as the number of operating dimensions. The movement of the links and joints are coordinated by computer control so that for each dimension of operation, there is one group of masses that moves in the same direction as the end effector center of mass and another group of masses capable of independently moving in the same or opposite direction.

Figure 9A:
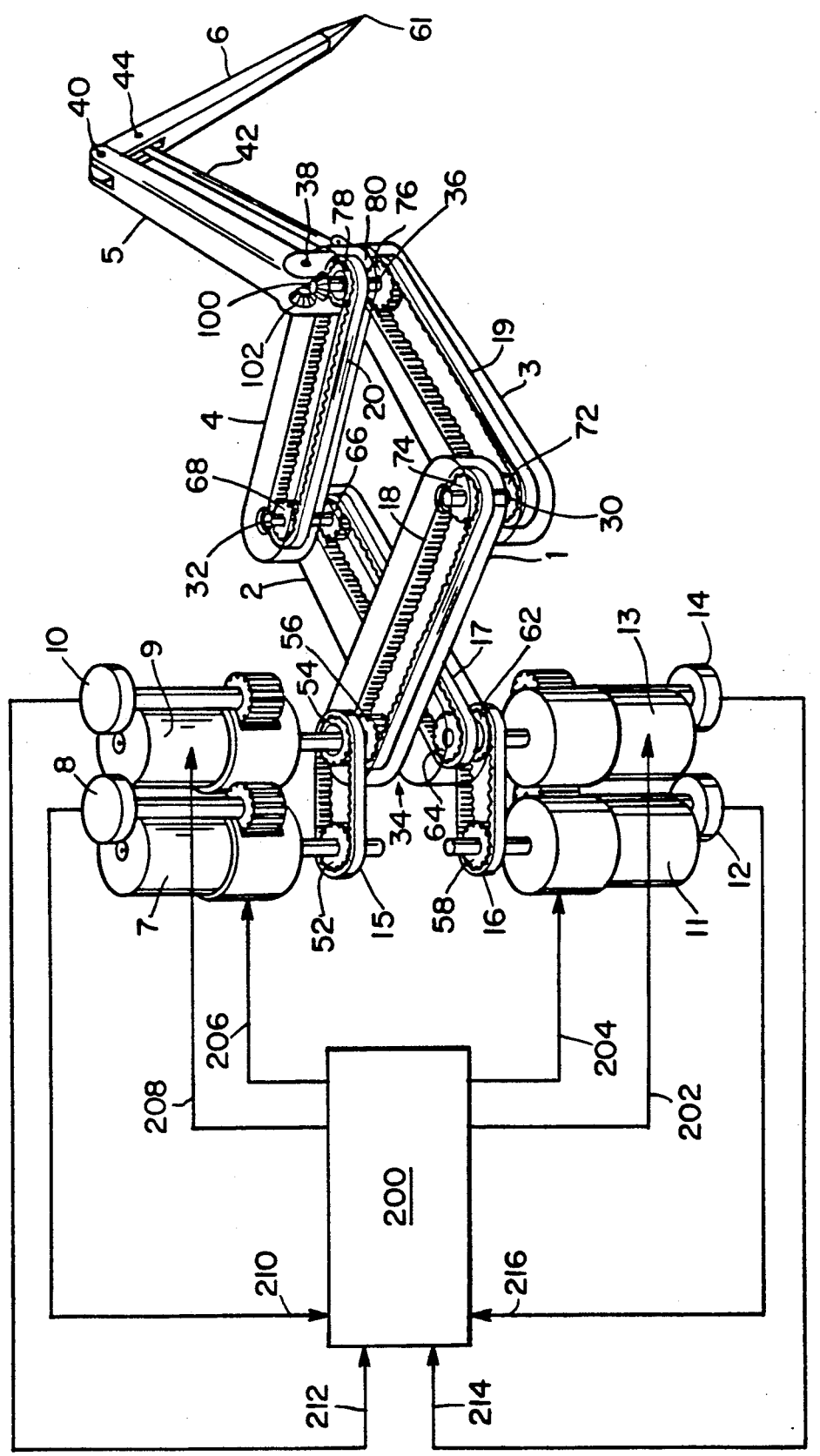
FIG. 9(a) is an exploded perspective view illustrating further details of the first embodiment.
Figure 9B:
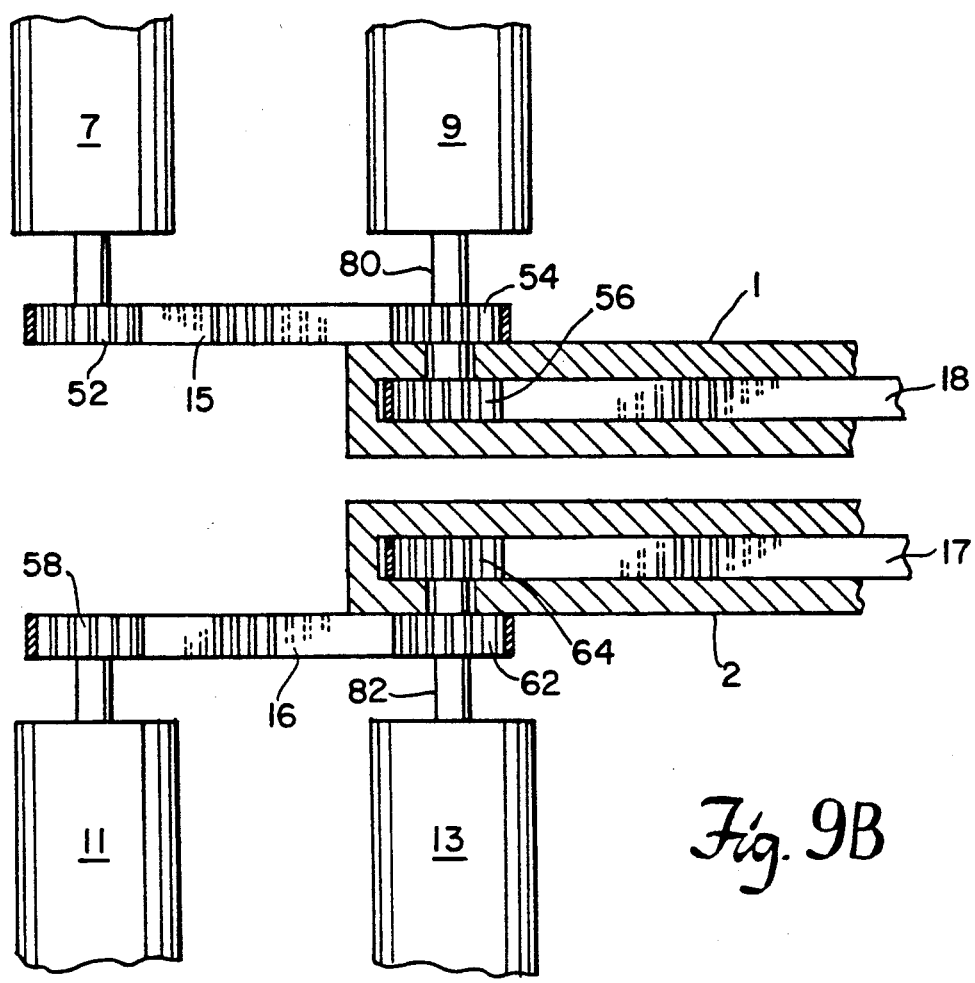
FIG. 9(b) illustrates the construction of joint 34 in the first embodiment of the invention.
Figure 9C:
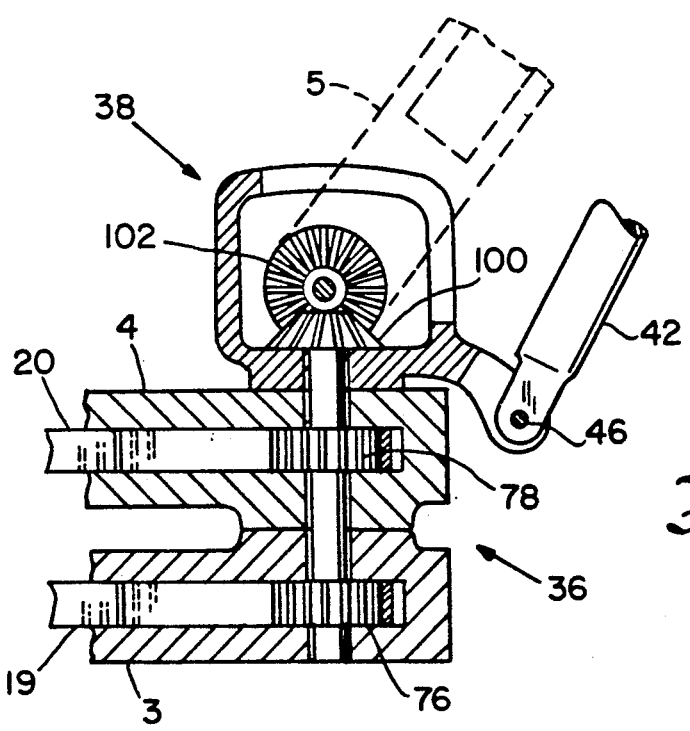
FIG. 9(c) illustrates the construction of joints 36 and 38 in the first embodiment of the invention.

FIGS. 9(a), 9(b), and 9(c) illustrate a detailed view of the planar robot of FIG. 8. Servo-controller 200, which serves as a dynamic controller, controls motors 7, 9, 11, and 13 in response to the positioning signals received from encoders 8, 10, 12, and 14. Also, the movement of the robot can be controlled in a predetermined manner. Joint positions are varied in accordance with the requisites of Equation (16). Servo-controller 200 is comprised of a microprocessor with a stored program which functions in accordance with the constraints of Equations (16) and (17). Servo-controller 200 determines the present and desired position of the end effector tip 61 by means of encoders 8, 10, 12, and 14. The required shape and position of links 1–4 to avoid reaction forces are calculated from Equations (16) and (17) and new joint positions are effected by driving motors 7, 9, 11, and 13.

To achieve the desired angles, the motors work in the following fashion. To move link 1, motor 7 drives gear 52 which in turn moves belt 15 as shown in FIGS. 9(a) and 9(b). Gear 54, which is fixed to link 1, moves in response to belt 15 to vary the position of link 1. The end effector tip 61 is extended or retracted in response to movement of motor 9. Motor 9 drives gear 56 which in turn moves belt 18. Gears 74 and 72 are driven in response to the movement of belt 18. As shown in FIG. 9(a), gear 72 drives belt 19 which moves gear 76. A shaft 80 connects bevel gear 100 to flat gear 76 which transmits power in turn to bevel gear 102. Movement of bevel gear 102 extends and retracts the end effector arm with respect to joint 38.

To move link 2, motor 11 drives gear 58 which in turn moves belt 16 which drives gear 62. Gear 62 moves link 2 about joint 34. Thus, motors 7 and 11 vary angles $\theta_1$ and $\phi_1$. Motor 9 varies angle $\theta_2$. To rotate the end effector about joint 36, motor 13 varies angle $\phi_2$. Motor 13 drives gear 64 which in turn moves belt 17. Gears 62 and 68 move in response to belt 17 moving and in turn drive belt 20. Belt 20 drives gear 78 which in turn rotates the position of the end effector.

Figure 9D:
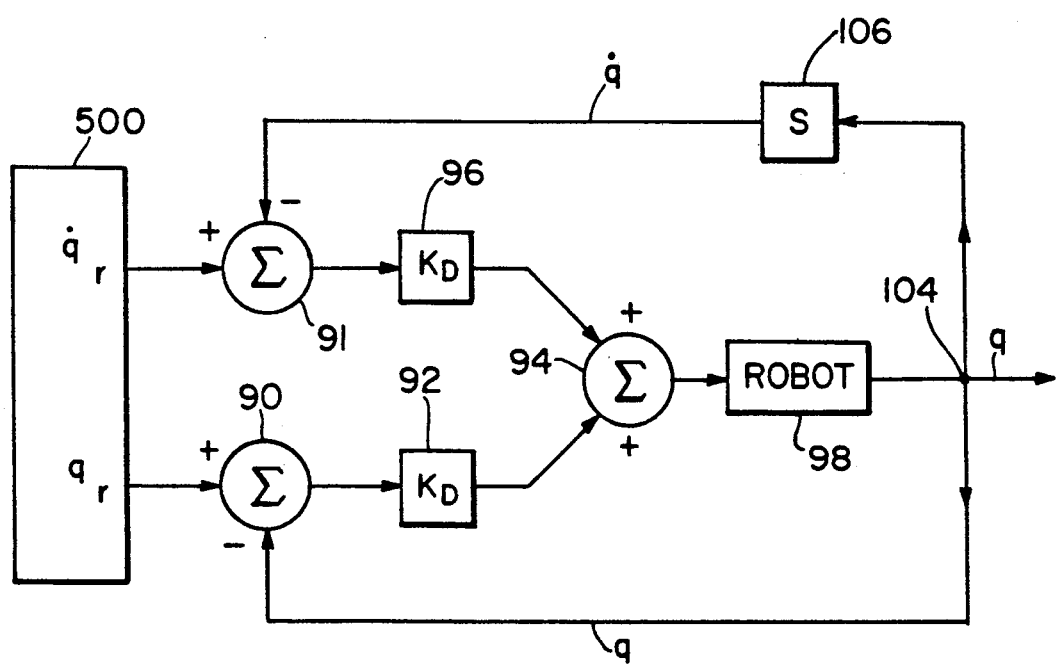
FIG. 9(d) illustrates a control circuit for the first embodiment of the invention.

FIG. 9(d) illustrates schematically the servo control circuit of servo-controller 200. Joint angles "$\dot{q}_r$" and joint angular velocities "$q_r$" are calculated by microprocessor 500 in accordance with Equations 16 and 17. A given joint angle "$q_r$" (e.g., $\theta_1$, $\theta_2$, $\phi_1$, or $\phi_2$) is summed with the signal representing the actual joint position q as detected by joint position sensor 104. The output of adder 90 is multiplied by circuit 92. The calculated joint angular velocity "$\dot{q}_r$" from microprocessor 500 is summed by adder 91 with the signal representing the actual joint velocity $\dot{q}$ found by differentiating circuit 106 which processes the signal from sensor 104. The output of adder 91 is multiplied by multiplier 96 and summed with the output of multiplier 92 by adder 94. The output from adder 94 is sent to the motor driver amplifier in robot 98. Thus, by using both position and velocity signals, the robot arm can be accurately controlled.

Although the preferred embodiment of the zero reaction force robot is shown with a fixed base, the mechanism can be used as a space manipulator with an inherent movable base. A space manipulator with a fixed center of mass will not generate reaction forces. Thus, robot of the invention can be operated in a space zero gravity environment or in a submarine environment with a moving base and a fixed center of mass which will not generate reaction forces.

Singularities

By taking the determinant of the extended Jacobian $J_e$ of Equation (17) and setting it to zero, the singularities of the robot can be determined. Singularities are configurations in which the robot no longer has its total freedom of motion. After simplifying, the determinant of the extended Jacobian is $$\sin \theta_1 \cos \theta_1 \sin \theta_2 \cos \theta_2 \cos (\phi_1 - \phi_2) \cos (\phi_1 + \phi_2)(A_1A_4 - A_2A_3)^2 = 0.$$

The first four trigonometric terms $\sin \theta_1 \cos \theta_1 \sin \theta_2 \cos \theta_2$ are the kinematic singularities. By setting each term equal to zero, the singularities occur when $\theta_1$ and $\theta_2 = 0$ or 90 degrees. These situations correspond to either each part of the robot arm being completely extended or completely contracted.

The rest of the terms represent the dynamically constrained singularities. These are configurations in which movement in some directions would result in the center of mass moving. These constrained singularities can be broken into two groups. The first group is configuration dependent and the second is constrained by the mass and dimensions of the robot. In the configuration dependent part, the double angle trigonometric terms cos $(\phi_1 - \phi_2)$ cos $(\phi_1 + \phi_2)$ can each be set to zero: $\phi_1 + \phi_2 = 90$ degrees and $\phi_1 - \phi_2 = 90$ degrees. This last relationship shows that if the arms for the redundant degrees of freedom are in a configuration where they are perpendicular to each other, there will be directions for which movement would necessitate violating the fixed center of mass criterion.

The second group of constrained singularities $(A_1A_4 - A_2A_3)^2$ is dependent only on mass and dimension properties. This group can also be set to zero. If $A_1A_4 = A_2A_3$, a constrained singularity for any configuration exists. That is, if the dimensions of the robot meet this equality, it will not be possible for the robot to move without moving its center of mass. This singularity can also be seen from Equation (16) by setting the numerator of the ratio equal to zero, which gives $\theta_1$ and $\theta_2$ as arctan $(\pm\sqrt{-1})$; hence no solutions exist for $\theta_1$ or $\theta_2$.

Workspaces

Not taking into account the dynamic constraints, the complete workspace can be determined for the redundant manipulator from the kinematic singularities. By setting $\theta_1$ and $\theta_2 = 0$, each part of the robot becomes completely extended. By setting $\phi_1 = \phi_2$ and varying these angles from 0 to 360 degrees, the robot's workspace is a circle with radius $(A_1 + A_2)$ which is the length of the entire arm completely extended, and its center is at the base. The dynamic singularities can be determined by examining Equation (16). For these functions, when $\theta_1$ and $\theta_2 = 0$, each part of the robot is extended (that is the argument of the arccos equals 1), multiplying through by the denominator and squaring both sides results in $$(A_4x - A_2X)^2 + (A_4y - A_2Y)^2 = (A_1A_4 - A_2A_3)^2$$

for $\theta_1 = 0$, and $$(A_3x - A_1X)^2 + (A_3y - A_1Y)^2 = (A_1A_4 - A_2A_3)^2$$

for $\theta_2 = 0$. For case, the dynamic work space can be found to be a circle with a radius of $(A_1A_4 - A_2A_3)$ and its center at $(A_2X, A_2Y)$ for the first case and $(A_1X, A_1Y)$ for the second case. Another interpretation of $A_1A_4 = A_2A_3$ is that the radius of the constrained workspace would be zero. By varying X and Y, which are the coordinates of the center of mass during a motion for which reaction forces can be tolerated, a dynamic workspace can be formed with radius $(A_1A_4 - A_2A_3)$ anywhere inside our kinematic workspace of radius $(A_1 + A_2)$.

Figure 10:
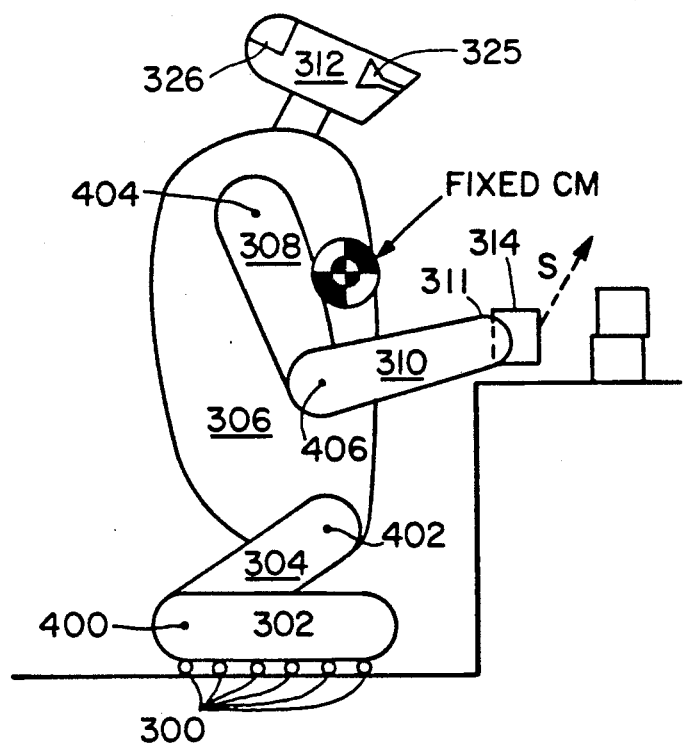
FIG. 10 is a schematic drawing of a zero reaction force robot with a humanoid form provided with redundant linkage coupling.

FIG. 10 illustrates a zero reaction robot in humanoid form. Head unit 312 contains a video camera 325 (which assists in the control of robot manipulations) and may contain a dynamic controller 326 for controlling link movement. However, the dynamic controller can be placed in any convenient position on the robot, such as link 306. Links 310 and 308 joined by joint 406 function as an end effector. Tip 311 of link 310 can be used to hold objects such as block 314. The body and leg elements of the robot which function as a redundant linkage coupling compensate for movement of the end effector links 308, 310 and joint 406. The coupling links move in two dimensions in a predetermined fashion pursuant Equation (7) and (8) in response to end effector movement. Thus, the redundancy criteria is satisfied and the reaction forces are decoupled from the robot base.

Body link 306 is coupled to the end effector by joint 404. Links 302 and 304 serve as leg elements and are joined to the body section by joint 402. Link 302 also serves as a base link. Joint 400 links the two leg elements. Lower leg 302 can be placed on rollers. As noted above, the center of mass of the robot is constrained to remain fixed. By satisfying the requisites of Equations (7) and (8), a portion of the coupling linkage mass moves in a direction opposite to that of the movement of the end effector mass. As a result, no reaction forces are transmitted to the base of the robot, link 302. Thus, the robot remains stationary despite being on rollers when arm 310 moves the cup 314.

Figure 15:
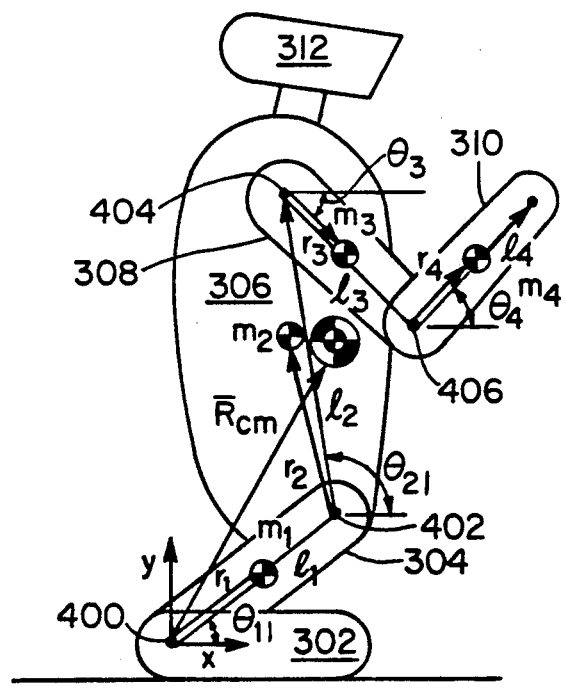
FIG. 15 is a schematic of a humanoid robot for defining joint positions.

FIG. 15 illustrates the positioning formulas for a humanoid robot. Link 302 serves as a base for the robot with joint 400 as the origin of the coordinate system. Leg link 304 has a length $l_1$ and a mass $m_1$, located at vector $r_1$. Body link 306 has a length $l_2$ (between the pivot points of joints 402 and 404) and a mass $m_2$ located at vector $r_2$. End effector link 308 has a length $l_3$ and a mass $m_3$ located at vector $r_3$. End effector link 310 has a length $l_4$ and a mass $m_4$ located at vector $r_4$. The shape and position of a given robot configuration can be described in terms of the angular displacement of joints 400, 402, 404, and 406. The angle $\theta_{11}$ represents the angular displacement of link 304 from the x axis. The angle $\theta_{21}$ represents the angular displacement of body link 306 from the x-axis. The angle $\theta_3$ represents the angular displacement of link 308 from the x-axis. The angle $\theta_4$ represents the angular displacement of link 310 from the x-axis.

Examining the horizontal plane of the robot of FIG. 15 shows that it meets the redundancy criterion, i.e. it has four degrees of freedom for planar motion of its end effector and that there are two groups of masses that can be moved independently. To find the governing equations for the coordinated motion of the end effector and center of mass, coordinates can be written using Equation (7).

The coordinates of the end effector can be expressed by using Equation (2), as follows:

$$x = l_1\cos\theta_{11} + l_2\cos\theta_{21} + l_3\cos\theta_3 + l_4\cos\theta_4$$
$$y = l_1\sin\theta_{11} + l_2\sin\theta_{21} + l_3\sin\theta_3 + l_4\sin\theta_4$$

Equation (18)

The center of mass coordinates can also be found by applying Equation (6) to give the coordinates:

$$X = A_1\cos\theta_{11} + A_2\cos\theta_{21} + l_3\cos\theta_3 + l_4\cos\theta_4$$
$$Y = A_1\sin\theta_{11} + A_2\sin\theta_{21} + l_3\sin\theta_3 + l_4\sin\theta_4$$

Equation (19)

where
$A_1 = \{m_1r_1 + l_1(m_2+m_3+m_4)\}1/M_T$
$A_2 = \{m_2r_2 + l_2(m_3+m_4)\}1/M_T$
$A_3 = \{m_3r_3 + m_4l_3\}1/M_T$
$A_4 = \{m_4r_4\}1/M_T$ Given these four equations in four unknowns a closed form solution exists although it is quite complex. A possibly simpler method of solution is to use numerical methods. This will give the joint angles in terms of the end effector and center of mass positions.

$$\theta_{11} = f_1(x,y,X,Y)$$
$$\theta_{21} = f_2(x,y,X,Y)$$
$$\theta_3 = f_3(x,y,X,Y)$$
$$\theta_4 = f_4(x,y,X,Y)$$

Equation (20)

By taking the first derivative of Equations (18) and (19), we can find the extended Jacobian.

$$\begin{bmatrix} \dot\theta_{11} \\ \dot\theta_{21} \\ \dot\theta_{31} \\ \dot\theta_{41} \end{bmatrix} = \begin{bmatrix} -l_1\sin\theta_{11} & -l_2\sin\theta & -l_3\sin\theta_3 & -l_4\sin\theta_4 \\ l_1\cos\theta_{11} & l_2\cos\theta & l_3\cos\theta_3 & l_4\cos\theta_4 \\ -A_1\sin\theta_{11} & -A_2\sin\theta & -A_3\sin\theta_3 & -A_4\sin\theta_4 \\ A_1\cos\theta_{11} & A_2\cos\theta & A_3\cos\theta_3 & A_4\cos\theta_4 \end{bmatrix}^{-1} \begin{bmatrix} \dot x \\ \dot y \\ \dot X \\ \dot Y \end{bmatrix}$$

Equation (21)

This expression relates the end effector and the center of mass velocities to joint angular velocities. Although no simple closed form solution exists, numerical methods can be used to solve for $\theta_{11}$, $\theta_{21}$, $\theta_3$, and $\theta_4$. Note that $X$ and $Y = 0$ for a fixed center of mass.

Second Embodiment

Figure 11:
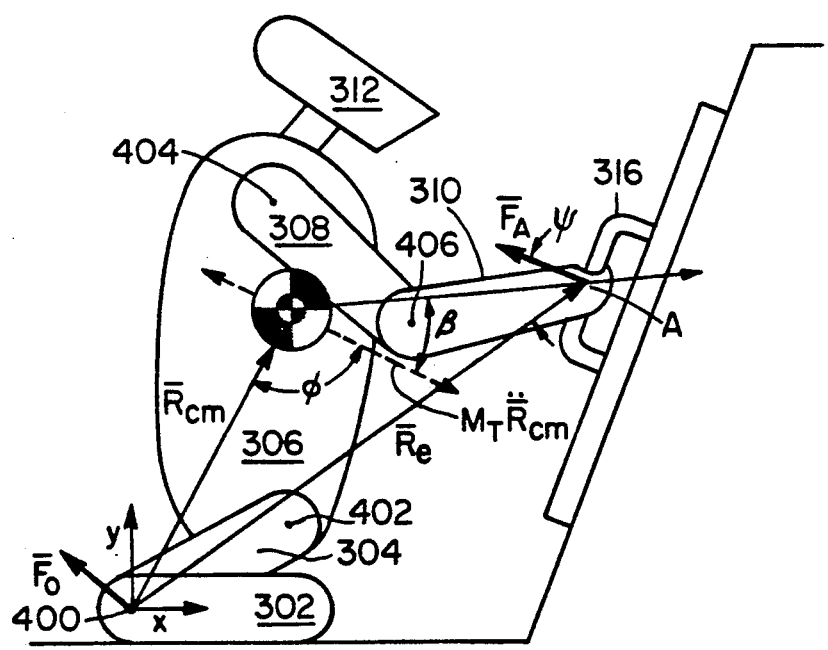
FIG. 11 is schematic of a second embodiment of the invention showing a robot with a fixed end effector and an accelerating center of mass to impart impulsive force to the end effector tip.
Figure 12:
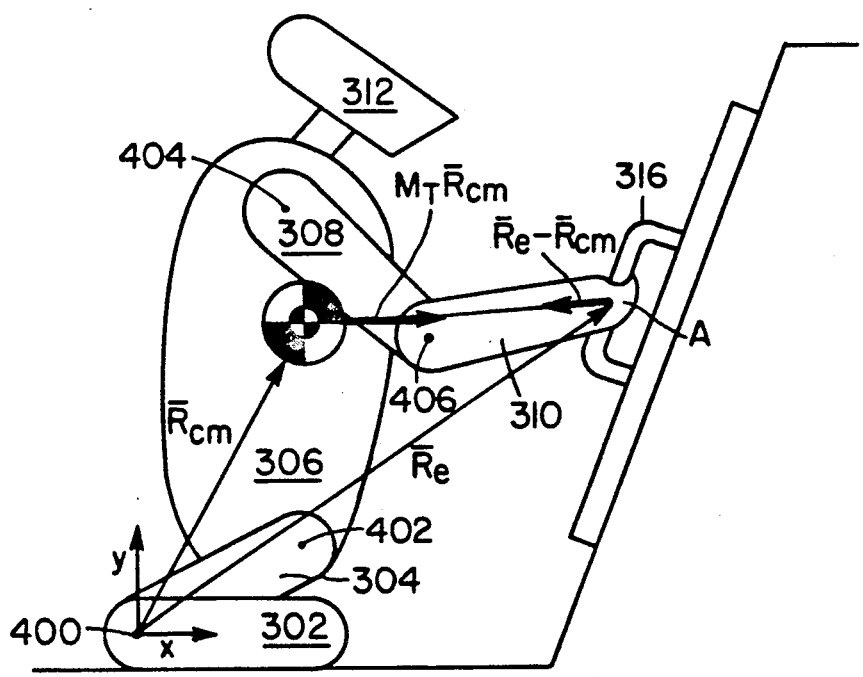
FIG. 12 is a schematic of a second embodiment of the invention where the center of mass of a robot moves along a line which passes through the fixed point of the clamped end effector tip such that reactive forces are decoupled from the base.

FIGS. 11, 12, 13, and 14 illustrate humanoid robots which apply forces to the environment by accelerating the center of mass. FIGS. 11 and 12 illustrate a second embodiment of the invention which can transmit impulsive forces to an element. As noted in the discussion of FIG. 10, the humanoid robot elements function as end effectors and coupling linkages. However, in this example, the tip of the end effector remains fixed or clamped at handle 316 and the center of mass of the robot is rapidly decelerated away from the handle and then rapidly accelerated towards the handle to impart an impulsive force to handle 316. This looping motion can be repeated to create a series of impulse forces. By decelerating and accelerating the center of mass of the robot rapidly, large impulse forces of relatively long duration (e.g., about 0.5 seconds) can be applied to handle 316. By using the total mass of the robot and not merely the driving force of the individual joint torques, forces can be larger than those produced by the individual sum of the individual joint torques. Moreover, by varying the period of time of deceleration and acceleration, the time of application and amount of impulse force can be varied as needed. Finally, by accelerating the center of mass along the line which intersects the point at which the end effector tip contacts the handle 316, reaction forces can be decoupled from base 302. Thus, large inpulsive forces can be applied to the environment without generating reaction forces at the base.

The impulse force generated by dynamically moving the robot center of mass can be expressed as:

$$|F_A| = \frac{|\ddot R_{cm}||\dot R_{cm}|M_T\sin\phi}{|R_e|\sin\psi}$$

Equation (22)

where $R_{cm}$ represents the length of the vector for the center of mass position, $\ddot R_{cm}$ is the acceleration of the center of mass, $M_T$ is the total moving mass of the robot, $\phi$ is the angular displacement of the path of the center of mass from the vector $R_{cm}$, $R_e$ is the vector position of the end effector tip, and $\Omega$ is the angular displacement of the impulse force $F_A$ from the vector $R$.

Thus, once a desired impulse force $F_A$ is determined, Equations (20) and (21) are used to determine the given joint displacements required to produce the desired force.

Since $\dot{x}$ and $\dot{y}$ remain constant, $\ddot{x}$ and $\ddot{y}=0$ in Equation (21).

To maximize $F_A$, let $$\phi = \frac{\pi}{2} \text{ or } \frac{3\pi}{2}$$

and $\Omega = 0$ or $\pi$.

The reaction force at the base $F_0$ is:

$$|F_0| = \frac{|\vec{R}_e - \vec{R}_{cm}||\ddot{R}_{cm}M_T\sin\theta|}{|R_e|\sin\beta} \quad \text{Equation (23)}$$

where $\beta$ is the angle between the direction in which the center of mass is accelerated and a line connecting the center of mass to attachment point A.

Thus, to achieve zero reaction forces at the base, the following conditions must be met:
$F_0 = |\vec{R}_e - \vec{R}_{cm}|\ddot{R}_{cm}M_T \sin \theta = 0$
$\vec{R}_e - \vec{R}_{cm} = 0$
$\vec{R}_e = \vec{R}_{cm}$
$\sin \theta = 0$
$\theta = 0$ or $\pi$ Thus, if the center of mass is accelerated along a line through the end effector's connection point as shown in FIG. 12, then no reactions result at the base.

Although the embodiment with a fixed end effector tip and accelerating center of mass has been shown in a preferred embodiment with a fixed base, an accelerating base could be used in a "climbing" mode. Thus, the robot could climb steps by fixing the tip of the end effector and lifting the base of the robot to the next higher level with a dynamic motion.

Third Embodiment

Figure 13:
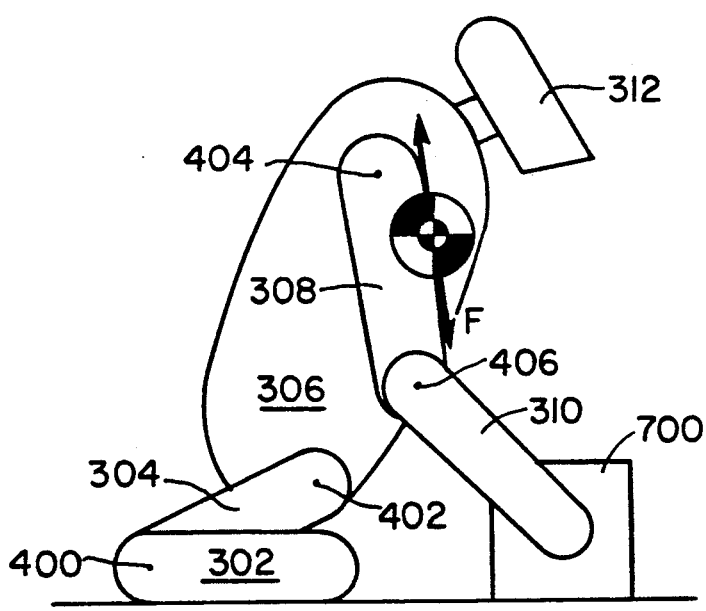
FIG. 13 is a schematic of a third embodiment of the invention where both the end effector and the center of mass of the robot are moved to lift an object.
Figure 14:
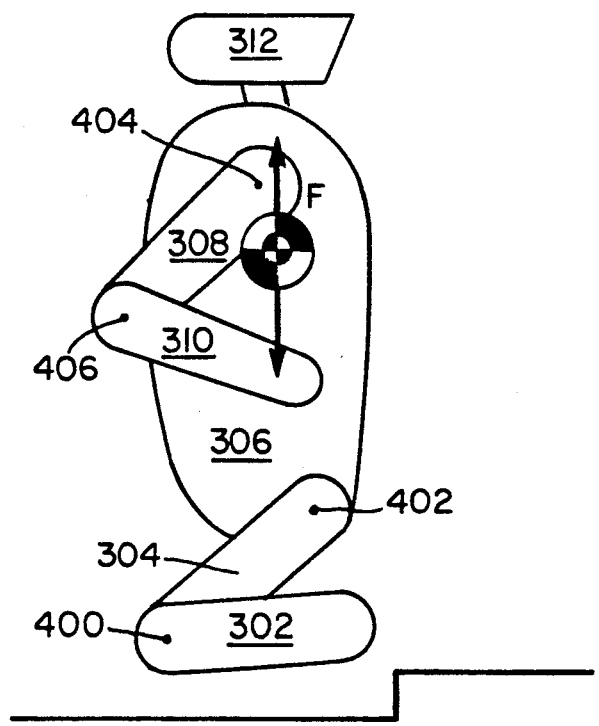
FIG. 14 is a schematic of a third embodiment of the invention where both the end effector and the center of mass of the robot are moved to provide a jumping motion.

FIGS. 13 and 14 illustrate a third embodiment of the invention where both the center of mass and the end effector tip move. FIG. 13 illustrates a robot which is used for lifting. As was noted in the second embodiment, by accelerating the total mass of the robot, tremendous forces can be applied to the ends of the end effectors. The robot of FIG. 13 can be used to hoist tremendous weights by using all the elements in its coupling linkage as well as the links in the end effector to accelerate the center of mass. Thus, a large lifting force is applied to box 700 which is attached to the end of link 310.

Similarly, these techniques can be used to cause the robot to jump, i.e. leave the ground completely. As shown in FIG. 14, by accelerating the center of mass of the robot directly away from the surface upon which the robot rests, the base of the robot 302 can be lifted completely off the resting surface.

Thus, it can be seen in review of the embodiment of FIGS. 10-14 that the trajectory needed to create the maximum duration of force is a looping motion. The center of the mass of the robot can be fixed to allow its end effector to move while creating zero reaction forces at the base. The end effector can be fixed and the center of mass can be accelerated to create a desired reaction force at the end effector. By accelerating the center of mass appropriately, a resulting force can be achieved at the end effector with no reaction forces at the base. The center of mass of the robot is moved to accomplish a plurality of tasks. The coordination of end effector movement and center of mass movement increases the force applied to the environment beyond that capable by traditional robots relying solely on joint torques.

While the invention has been particularly shown and described with reference to a preferred embodiment thereof, it will be understood by those skilled in the art that various changes in form and details may be made therein without departing from the spirit and scope of the invention as defined by the appended claims.

I claim:

1. A robot with a dynamically controlled center of mass comprising:
   (a) a robot arm including:
      (i) an end effector linkage including an end effector which can move in n dimensions of operation, wherein for each dimension of operation, a first mass is provided which moves in the same direction of movement as the end effector,
      (ii) a redundant linkage, including a plurality of links and joints, coupled to said end effector, wherein the redundant linkage includes a second mass which can be independently moved in the same or opposite direction of movement of the first mass, and
   (b) a dynamic controller for moving the robot arm so that for each dimension of movement of the end effector there are at least two degrees of freedom of the robot arm to decouple the center of mass from the end effector.

2. A zero-reaction force robot comprising:
   (a) a base;
   (b) a robot arm with a center of mass including:
      (i) an end effector linkage including an end effector which can move in n dimensions, where n is an integer, and for each dimension of operation, the end effector includes a first mass which moves in the same direction of movement as the end effector,
      (ii) a redundant linkage, including a plurality of links and joints, which connects the end effector to the base such that the robot arm has 2n degrees of freedom wherein the redundant linkage includes a second mass which can be independently moved in the same or opposite direction of movement of the first mass of the end effector, and
   (c) a dynamic controller for moving the robot arm such that the redundant linkage is repositioned in response to end effector movement to fix the position of the center of mass and prevent the coupling of reaction forces to the base.

3. A zero-reaction force robot, as recited in claim 2, wherein the redundant linkage further comprises:
   a first link;
   a second link coupled to said first link and said base by a first moving joint;
   a third link coupled to said first link by a second moving joint;
   a fourth link coupled to said second link by a third moving joint; and
   a fourth moving joint coupling said third and fourth links together so that the redundant linkage forms a planar parallelogram.

4. A zero-reaction force robot, as recited in claim 3, wherein the end effector linkage further comprises:
   a fifth link with a first end and a second end;
   a fifth moving joint coupled to said first end of said fifth link and to said fourth moving joint;

a sixth moving joint connected to said second end of said fifth link; and a sixth link, with a tip which serves as the end effector, coupled to said fifth link by said sixth moving joint so that the sixth link tip moves in a plane.

5. A zero-reaction force robot, as recited in claim 4, wherein the dynamic controller moves the redundant linkage and the end effector in accordance with the following constraint:

$$\phi_1 = \arctan\left(\frac{A_4 y - A_2 Y}{A_4 x - A_2 X}\right)$$

$$\phi_2 = \arctan\left(\frac{A_3 y - A_1 Y}{A_3 x - A_1 X}\right)$$

$$\theta_1 = \arctan\left(\pm\sqrt{\frac{(A_1 A_4 - A_2 A_3)^2}{(A_4 x - A_2 X)^2 + (A_4 y - A_2 Y)^2} - 1}\right)$$

$$\theta_2 = \arctan\left(\pm\sqrt{\frac{(A_1 A_4 - A_2 A_3)^2}{(A_3 x - A_1 X)^2 + (A_3 y - A_1 Y)^2} - 1}\right)$$

$$\begin{bmatrix}\dot{\phi}_1\\ \dot{\theta}_1\\ \dot{\phi}_2\\ \dot{\theta}_2\end{bmatrix} = \begin{bmatrix}-A_1\cos\theta_1\sin\phi_1 & -A_1\sin\theta_1\cos\phi_1 & -A_2\cos\theta_2\sin\phi_2 & -A_2\sin\theta_2\cos\phi_2\\ A_1\cos\theta_1\cos\phi_1 & -A_1\sin\theta_1\sin\phi_1 & A_2\cos\theta_2\cos\phi_2 & -A_2\sin\theta_2\sin\phi_2\\ -A_3\cos\theta_1\sin\phi_1 & -A_3\sin\theta_1\cos\phi_1 & -A_4\cos\theta_2\sin\phi_2 & -A_4\sin\theta_2\cos\phi_2\\ A_3\cos\theta_1\cos\phi_1 & -A_3\sin\theta_1\sin\phi_1 & A_4\cos\theta_2\cos\phi_2 & -A_4\sin\theta_2\sin\phi_2\end{bmatrix}^{-1} \begin{bmatrix}\dot{x}\\ \dot{y}\\ \dot{X}\\ \dot{Y}\end{bmatrix}$$

where x, y is the position of the end effector tip, $\dot{x}$, $\dot{y}$ is velocity of the end effector, X, Y is the position of the robot center of mass, $\dot{X}$, $\dot{Y}$ is the velocity of the robot center of mass, $\phi_1$ is the angular displacement of a diagonal connecting the first and fourth joints from the base, $\phi_2$ is the angular displacement of the end effector from the base, $\theta_1$ is the angular displacement of the diagonal from the first link, $\theta_2$ is the angular displacement of the fifth link and the sixth link from the plane of the redundant linkage, $A_1$ is the length of the redundant linkage completely extended, $A_2$ is the length of the end effector completely extended, $A_3$ is the center of mass location of the redundant linkage, and $A_4$ is the center of mass location of the end effector linkage.

6. A zero-reaction force robot, as recited in claim 5, wherein the robot configuration is controlled in accordance with a joint position feedback signal and a joint velocity feedback signal.

7. A zero-reaction force robot comprising:

a linkage including a plurality of vertexes;

an end effector connected to a first vertex of said linkage;

a base connected to a second vertex of said linkage which is opposite the vertex connected to the end effector; and a motor which varies the shape and position of the linkage in accordance with the movement of the end effector such that the center of mass of the robot remains fixed.

8. A method of eliminating reaction forces in a robot, said robot including a robot arm, a base, and a linkage coupling the robot arm to the base, said method comprising the steps of:

(a) determining the desired position of the robot arm;

(b) calculating the shape and position of the linkage which will balance the reaction forces produced by the moving robot arm so that the center of mass of the robot remains fixed;

(c) moving the robot arm to the desired position; and (d) controlling the movement of the linkage according to the calculated values during the movement of the robot arm so that the center of mass of the robot remains fixed.

9. A humanoid zero-reaction force robot with a dynamically controlled center of mass comprising:

a base link, a first moving joint, a redundant linkage including:

a leg link, said first moving joint coupling the leg link to the base link, a body link, a second moving joint coupling the body link to said leg link, an end effector linkage including:

a first arm link coupled to said body link by a third moving joint, a second arm link, including a holding tip which serves as an end effector, coupled to said first arm link by a fourth moving joint, wherein for each dimension of operation, the end effector linkage includes a first mass which moves in the same direction of movement as the end effector and the redundant linkage includes a second mass which can be moved in the opposite direction of movement of the first mass of the end effector, a head unit, connected to the body unit, including:

a video camera, and a dynamic controller for moving the robot arm so that for each dimension of operation of the end effector there are at least two degrees of freedom of the robot arm to decouple the center of mass from the end effector and prevent the coupling of reaction forces to the base link.

10. A robot with a dynamically controlled center of mass comprising:
   (a) a base,
   (b) a robot arm including:
      (i) an end effector linkage having a clamping tip which can move in n dimensions, said clamping tip is attached to a final point at which force is to be applied, for each dimension of operation, the end effector linkage includes a first mass which moves in the same direction of movement as the end effector linkage,
      (ii) a redundant linkage, including a plurality of links and joints, which connects the end effector linkage to the base such that the robot arm has 2n degrees of freedom wherein the redundant linkage includes a second mass which can be independently moved in the same or opposite direction of movement of the first mass of the end effector linkage, and
   (c) a dynamic controller for moving the robot arm such that the robot center of mass is accelerated and decelerated to apply an impulsive force at the clamping tip.

11. A robot, as recited in claim 10, wherein the robot center of mass moves along a line which passes through the fixed point attached to the clamping tip such that reactive forces are decoupled from the base.

12. A humanoid robot with a dynamically controlled center of mass comprising:
   a base link,
   a first moving joint,
   a redundant linkage including:
      a leg link,
      said first moving joint coupling the leg link to the base link,
      a body link,
      a second moving joint coupling the body link to said leg link,
   an end effector linkage including:
      a first arm link coupled to said body link by a third moving joint,
      a second arm link, including a clamping tip which serves as an end effector attached to a fixed point, coupled to said first arm link by a fourth moving joint,
   wherein for each dimension of operation, the end effector linkage includes a first mass which moves in the same direction of movement as the end effector and the redundant linkage includes a second mass which can be independently moved in the same or opposite direction of movement of the first mass of the end effector,
   a head unit, connected to the body unit, including:
      a video camera, and
      a dynamic controller for moving the robot arm so that for each dimension of operation of the end effector there are at least two degrees of freedom of the robot arm to decouple the center of mass from the end effector to accelerate the center of mass to impart an impulsive force at the fixed point.

13. A method of applying an impulsive force using a robot, said robot including a base, a robot arm including an end effector having a clamping tip and a redundant linkage, and a dynamic controller for moving the robot arm, said method comprising:
   (a) attaching the clamping tip to a fixed point at which force is to be applied,
   (b) determining the desired force to be applied at the fixed point,
   (c) calculating the required movement of the robot arm to accelerate the center of mass to impart the desired force of the fixed point, and
   (d) dynamically controlling the movement of the robot arm in accordance with the calculated required movement to accelerate the center of mass to impart an impulsive force at the fixed point.

14. A method, as recited in claim 13, wherein the robot center of mass moves along a line which passes through the fixed point attached to the clamping tip such that reactive forces are decoupled from the base.

15. A robot with a dynamically controlled center of mass comprising:
   (a) a base, resting on a surface,
   (b) a robot arm including:
      (i) an end effector which can move in n dimensions,
      (ii) a redundant linkage, including a plurality of links and joints, which connects the end effector to the base such that the robot arm has 2n degrees of freedom, and
   (c) a dynamic controller for moving the robot arm such that the robot center of mass is accelerated away the surface to cause the entire robot and base to jump off the surface.

16. A robot with a dynamically controlled center of mass comprising:
   (a) a base, resting on a first surface,
   (b) a robot arm including:
      (i) an end effector, with a clamping tip for holding an object resting on a second surface, which can move in n dimensions,
      (ii) a redundant linkage, including a plurality of links and joints, which connects the end effector to the base such that the robot arm has 2n degrees of freedom; and
   (c) a dynamic controller for moving the robot arm such that the robot center of mass is accelerated so that the object is lifted off the second surface.

* * * * *

UNITED STATES PATENT AND TRADEMARK OFFICE
CERTIFICATE OF CORRECTION

PATENT NO. : 5,214,749
DATED : May 25, 1993
INVENTOR(S) : Kevin L. Brown

It is certified that error appears in the above-identified patent and that said Letters Patent is hereby corrected as shown below:

Col. 21, line 39, delete "X, Y" and insert --$\dot{X}, \dot{Y}$--.

Col. 24, line 40, after "away" insert --from--.

Signed and Sealed this

Twenty-second Day of February, 1994

*Attest:*

BRUCE LEHMAN

*Attesting Officer*  *Commissioner of Patents and Trademarks*